(12) United States Patent
Spring et al.

(10) Patent No.: US 7,181,468 B2
(45) Date of Patent: Feb. 20, 2007

(54) CONTENT MANAGEMENT FOR RICH MEDIA PUBLISHING SYSTEM

(75) Inventors: Leslie Spring, Granada Hills, CA (US); Todd Hollenbeck, Hermosa Beach, CA (US); James Andreas Hjelming, Santa Monica, CA (US); Galvin Karan Hsiu, Los Angeles, CA (US); Jose Armando Pena, Duarte, CA (US); Omar Hamoui, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 10/813,858

(22) Filed: Mar. 30, 2004

(65) Prior Publication Data

US 2005/0102260 A1 May 12, 2005

Related U.S. Application Data

(60) Provisional application No. 60/466,431, filed on Apr. 28, 2003.

(51) Int. Cl.
*G06F 7/00* (2006.01)

(52) U.S. Cl. .................. 707/104.1; 707/100; 707/101; 707/3; 707/4; 709/203; 709/206

(58) Field of Classification Search ................ 707/100, 707/101, 2–4, 102, 10, 104.1; 709/206, 203; 364/408
See application file for complete search history.

(56) References Cited

U.S. PATENT DOCUMENTS

| | | | |
|---|---|---|---|
| 5,270,922 A * | 12/1993 | Higgins ....................... 705/37 |
| 6,460,043 B1 * | 10/2002 | Tabbara et al. ............. 707/100 |
| 2002/0010679 A1 | 1/2002 | Felsher |
| 2002/0010798 A1 | 1/2002 | Ben-Shaul et al. |
| 2002/0019827 A1 | 2/2002 | Shiman et al. |
| 2002/0194195 A1 * | 12/2002 | Fenton et al. ............ 707/104.1 |
| 2003/0014421 A1 | 1/2003 | Jung |
| 2004/0032348 A1 * | 2/2004 | Lai et al. ...................... 341/50 |
| 2004/0093377 A1 * | 5/2004 | Lumera et al. ............. 709/203 |
| 2004/0215725 A1 * | 10/2004 | Love et al. ................. 709/206 |
| 2004/0230636 A1 | 11/2004 | Masuoka et al. |

* cited by examiner

*Primary Examiner*—Charles Rones
*Assistant Examiner*—Belix M. Ortiz
(74) *Attorney, Agent, or Firm*—Samuel S. Lee; Procopio, Cory, Hargreaves & Savitch LLP

(57) ABSTRACT

A content management system for media publishing, comprising: a plurality of content management tools for managing media contents during a publication process; and a publishing pipeline configured to operate in concert with the plurality of content management tools during the publication process to control development, distribution, and access of the media contents, wherein the publishing pipeline provides a plurality of environments for staged and organized development and publication of the media contents.

29 Claims, 34 Drawing Sheets

2100

CONTENT MANAGEMENT FOR RICH MEDIA PUBLISHING SYSTEM

CROSS-REFERENCE TO RELATED APPLICATIONS

This application claims the benefit of priority of co-pending U.S. Provisional Patent Application Ser. No. 60/466,431, entitled "Rich Media Publishing", filed Apr. 28, 2003. Benefit of priority of the filing date of Apr. 28, 2003 is hereby claimed, and the disclosure of the Provisional Patent Application is hereby incorporated by reference.

This application is related to co-pending U.S. patent application Ser. No. 10/813,868, entitled "Rich Media Publishing", filed Mar. 30, 2004, and co-pending U.S. patent application Ser. No. 10/813,874, entitled "Support Applications for Rich Media Publishing", filed Mar. 30, 2004, Disclosures of these U.S. patent applications are hereby incorporated by reference.

BACKGROUND

The rapid publication of media content is desirable for publishers intent on delivering media content faster to larger audiences. The digital representation of media content combined with computing and networking technologies now provide a powerful way to publish. According to this new mode of publishing, networking technology permits the delivery of digitized media content over a network to end user computers. Communication protocols define how the digitized media content is exchanged over the network. A media player runs on the end user computer (e.g., as software application) to allow the user to play or otherwise experience the media content.

Digital representations of media content come in different types. These types are generally defined according to a series of publishing variables which can include, but are not limited to, the file format, bit rate, communication protocol(s), physical medium, compression algorithm, and/or digital rights management information associated with the media content. The type of digitized media content used will depend upon a number of factors, such as, the computing and/or networking technology used in the process of publishing and the nature of the content itself.

Digitized media content types can also be categorized according to the type of encoding or compression technique that is used to reduce the physical size of the media content, or according to the type of physical medium that supports the storage of the media content. Different kinds of physical medium are used in publishing media content, such as magnetic or optical storage devices, memory devices, and wireless mediums.

The emergence of a growing number of media players has created a widening gap between the richness of the various types of media content and the diverse capabilities of the client devices to handle the content. As a result, the technology selection process for the end user has become quite complicated. For example, the user often cannot be certain that a given media player will be able to play the type of media content in which he or she is interested. Also, the user may be required to frequently download new media playing software in order to access desired content.

SUMMARY

This disclosure provides system and method for implementing content management for media publishing. In one implementation, a content management system for media publishing, comprising: a plurality of content management tools for managing media contents during a publication process; and a publishing pipeline configured to operate in concert with the plurality of content management tools during the publication process to control development, distribution, and access of the media contents, wherein the publishing pipeline provides a plurality of environments for staged and organized development and publication of the media contents.

In another implementation, a method of managing media contents, comprising: providing a plurality of content management tools; and configuring a publishing pipeline to operate in concert with said plurality of content management tools during publication process to control development, distribution, and access of the media contents and data, wherein said configuring a publishing pipeline provides a plurality of environments for staged and organized development and publication of the media contents.

DETAILED DESCRIPTION

This disclosure describes systems and methods that provide greater efficiency and simplicity in management of media contents. As used herein, the term "media contents" refers to any information, including audio, video, images, sound, data, text, other contents, or combination of these contents, which can be perceived by human senses.

Content management provides an environment for users to render and manage media using Create Once Render Everywhere (CORE) platform, which enables Rendering services, user interface (UI) Management service, Publishing services, and Content Management Services (CMS).

In one implementation, a user at a desktop or laptop computer connects to a Rich Media Publishing (RMP) server system through the Internet using a web browser software application. The RMP server system presents a web site that, among other services, allows a user to build and publish an RMP project. To build a project, the user selects an RMP template. The template is a presentation framework and includes a number of media slots. Each media slot defines a genre of media (e.g., image, audio, video) and a specific target format (e.g., a JPEG format image that is 320×480 pixels).

The user selects a media item for each media slot in the selected template from a repository according to the genre of the media slot. The repository is part of the RMP server system and stores media items of various genres in various formats. The user can also upload media items to be stored in the repository and select uploaded media items for media slots. The specific format of a selected media item does not need to match the target format of the corresponding media slot because the RMP server system provides transcoding to convert a media item to the target format when presenting the project.

In addition, each template belongs to a category of templates. Templates in the same category have the same number and genres of media slots. While each template may provide a different presentation, the media slots are the same, and so the same media items can be used for templates in the same category. As a result, the user can switch among templates in the same category without changing the media item selections.

After the user has completed building the project, the user can publish the project. The published project is available to the user and other users to access from the RMP server system. When a user accesses the published project, the RMP server system presents the template and the media items assigned to the media slots of the user. The RMP server system provides the media items in the target formats defined by the template and so provides appropriate transcoding. In this way, the user can share media with other users in an enjoyable and creative environment.

Figure 1:
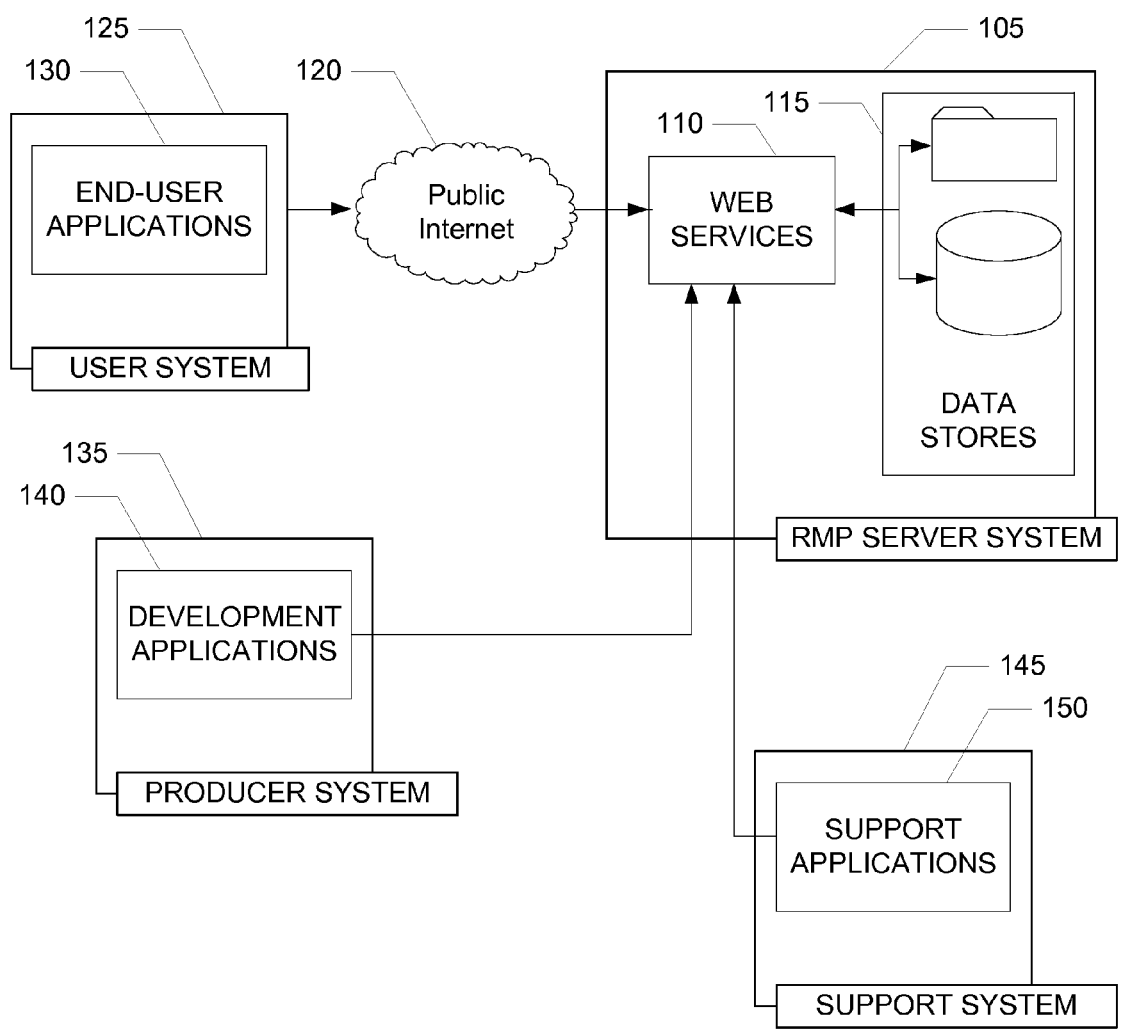
FIG. 1 shows one implementation of a Rich Media Publishing environment.

FIG. 1 shows one implementation of a rich media publishing environment 100. An RMP server system 105 includes components providing web services 110 and data stores 115. The RMP server system 105 includes one or more network servers (not shown) linked together in a local internal network to implement these components. The web services 110 are a combination of application programs to provide the services described below. In one implementation, the web services 110 are presented to a user as a web site including a hierarchy of web pages with embedded controls. The data stores 115 include one or more data storage systems to provide database storage as well as file storage, such as in a hierarchical file system. The RMP server system 105 is connected to the public Internet 120 for communication with clients.

The web services 110 are provided by an RMP platform, a CORE platform, and a content distribution platform (CDP). The RMP platform allows users to manage and publish media. The RMP platform includes a Member Publishing service, a Repository service, Repository Filters services, and Administrative services. The Member Publishing service allows users to build RMP projects by manipulating data and media items, as well as data structures forming the RMP templates. As discussed below, templates are built by producers (developers) using development applications. Producers build templates according to guidelines set out in a Template Development Kit, distributed to producers. As discussed below, users interact with the RMP server system through a client system to build a project based on a selected template and selected media items. The Repository service provides a repository that is a virtual file system that allows clients (users and producers) to access media items available to projects. From the user's point of view, the media items are presented for selection and manipulation by the user so as to appear to be stored in a hierarchical file system, while the actual organization of media items and data is hidden from the user. For example, while the user may be shown that all the image media items are grouped together, in fact the image media items are separated by format. The Repository Filters services provide a framework for performing operations on retrieved media items in the course of uploading and downloading media items. As discussed below, a filter performs one or more operations on a media item to convert the media item (non-destructively) from its original format to a format closer to or matching the target format specified by a template. Two examples of filters are an image manipulation system providing resizing of an image, and an audio transcoder for changing the format of an audio media item (e.g., from MP3 to SWF). The Administrative services provide support for customer service (e.g., by allowing data and file access and manipulation by a customer service client). In one implementation, the web services also support subscriptions for user and payment facilities. In addition, the web services can also support different levels of subscriptions and so provide different levels of access to the services and resources of the RMP server system.

The CORE platform provides a multi-renderer multi-language engine that allows multiple user interface (UI) representations to be derived from a single source written in IDML (Interface Definition Markup Language). As stated above, the CORE platform enables Rendering services, UI Management services, Publishing services, and Content Management services (CMS). The Rendering services provide a rendering pipeline for transforming the IDML representation of a UI into a specific XML rendering language (e.g., HTML, WML) and into human readable language. The UI Management services provide support for a UI Management tool used by producers for editing IDML primitives and collections. The Publishing services provide a publishing pipeline that allows clients to select sources for both IDML and content data and target systems for deployment. The Content Management services provide support for managing content areas in the RMP server system 105.

The CDP platform provides support for identity and commerce transactions. The CDP platform includes Identity services and Commerce services. The Identity services support registration and login functionality. The Commerce services provide access to product listings, pricing, and promotions, and support financial transactions (e.g., credit card transactions).

A user system 125 is also connected to the Internet 120. The user system 125 communicates with the RMP server system 105 through the Internet 120. The user system 125 includes one or more end-user applications 130. The end-user applications 130 are for accessing the RMP server system 105 and uploading and downloading data and media items to build, publish, and present RMP projects. In one implementation, the end-user applications 130 include a web browser software application, a member publishing tool, a member publishing viewer, a web folder, an upload control, and storage tools. The web browser is a HTTP/HTML client application. Applications from the RMP server system 105 can run in the web browser, such as a file access application. The member publishing tool runs embedded in the web browser (e.g., as a Flash MX based application) and allows the user to build and publish projects with the RMP server system 105. The member publishing viewer runs embedded in the web browser or as a separate application (e.g., as a Flash 5- of MX-based application) and allows viewing of a project. The web folder provides for manipulation of media items and files stored on the RMP server system 105 using a folder-based file interface (e.g., the native Windows Explorer interface). The web folder interacts with the Repository service of the RMP server system 105. The upload control is a control embedded in the web browser (e.g., as an active X (win32 driven) control) and allows users to use "drag & drop" to upload files to the RMP server system 105. The upload control also interacts with the Repository service. The storage tools also provide support for storing media items on the RMP server system 105 (e.g., as native WIN32 applications providing Sonic Foundry tools).

A producer system 135 is connected to the RMP server system 105. In another implementation, the producer system is included within the RMP server system. In yet another implementation, the producer system is connected to the Internet and communicates with the RMP server system through the Internet. The producer system 135 includes one or more development applications 140. The development applications 140 are for accessing the RMP server system 105 to build and support the web services of the RMP server system 105, such as to build and publish templates for users to work with in building projects. In one implementation, the development applications 140 include a CORE UI management tool and a CMS tool. The CORE UI management tool supports building, editing, and publishing IDML user interfaces. The IDML UI's can be designed to be renderer- and language-independent. The IDML UI's can then be published in multiple rendering environments. The CMS tool supports management of content written for a specific renderer. These tools support a separation of content and UI's.

A support system 145 is also connected to the RMP server system 105. In another implementation, the support system is included within the RMP server system. In yet another implementation, the support system is connected to the Internet and communicates with the RMP server system through the Internet. The support system 145 includes one or more support applications 150. The support applications 150 are for accessing the RMP server system 105 to support the web services of the RMP server system 105, such as for maintenance. In one implementation, the support applications 150 include a customer service application. A customer service representative at the support system uses the customer service application to access and control a user's files, media items, and projects.

The RMP environment allows a user to create and publish an RMP project. A user at a user system uses the end-user applications, such as a web browser and member publishing tool, to design the project. The RMP server system builds the project using the Member Publishing service. In addition, the creation of a project is supported by the uploading and selection of media items in the repository of the RMP server system. In one implementation, the RMP server system generates XML and/or HTML code for a project, including links to data and media items stored in the RMP server system. The generated code is used by client systems to present the project.

The Member Publishing service provides access to data structures implementing a collection of templates. A template has a layout and one or more visual and/or audio features (e.g., background image, background video, background music, animations, slide shows, sounds, controls, etc.). The layout and features are set by a producer that built the template (e.g., using HTML code and corresponding media items). The layout and features of a template are generally not to be changed by an end-user. A template also has one or more media slots. A media slot is an open or undefined part of the template. A media item can be assigned to each media slot. In one implementation, a media slot has a data structure (or part of a data structure) to store a reference to an assigned media item. In one implementation, the project is a data structure that includes template data structure according to a selected template and includes a media slot data structure for each media slot in the selected template. It is these media slot data structures that indicate the assigned media items.

Figure 2A:
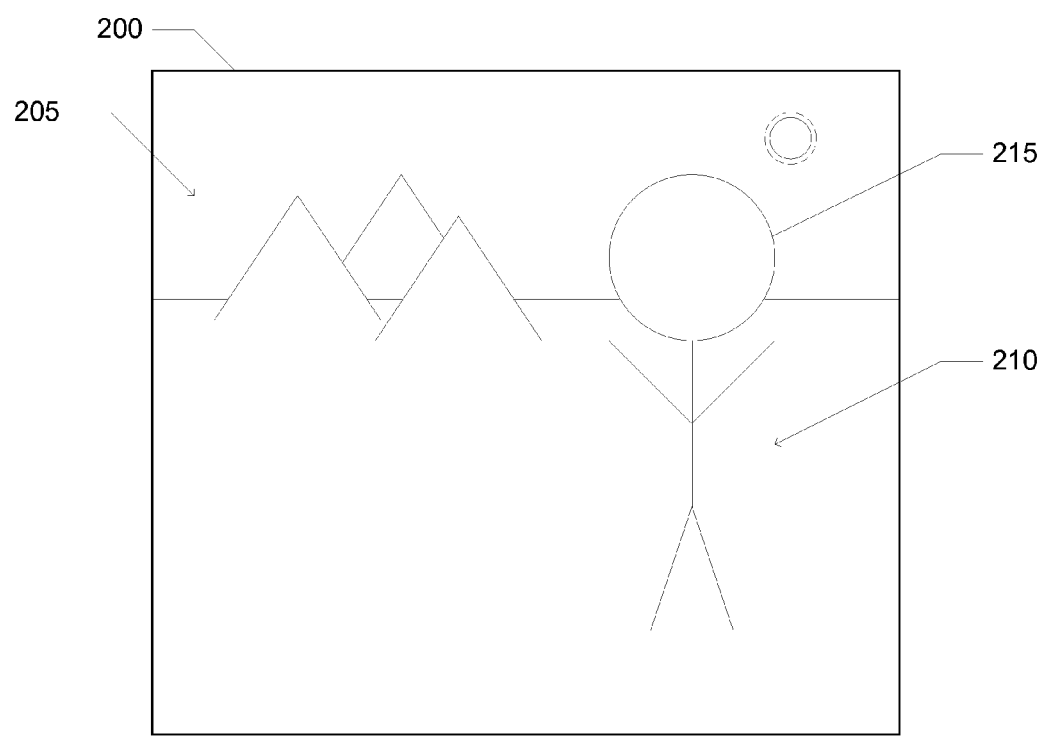
FIG. 2A shows an example of the layout and features of a template.
Figure 2B:
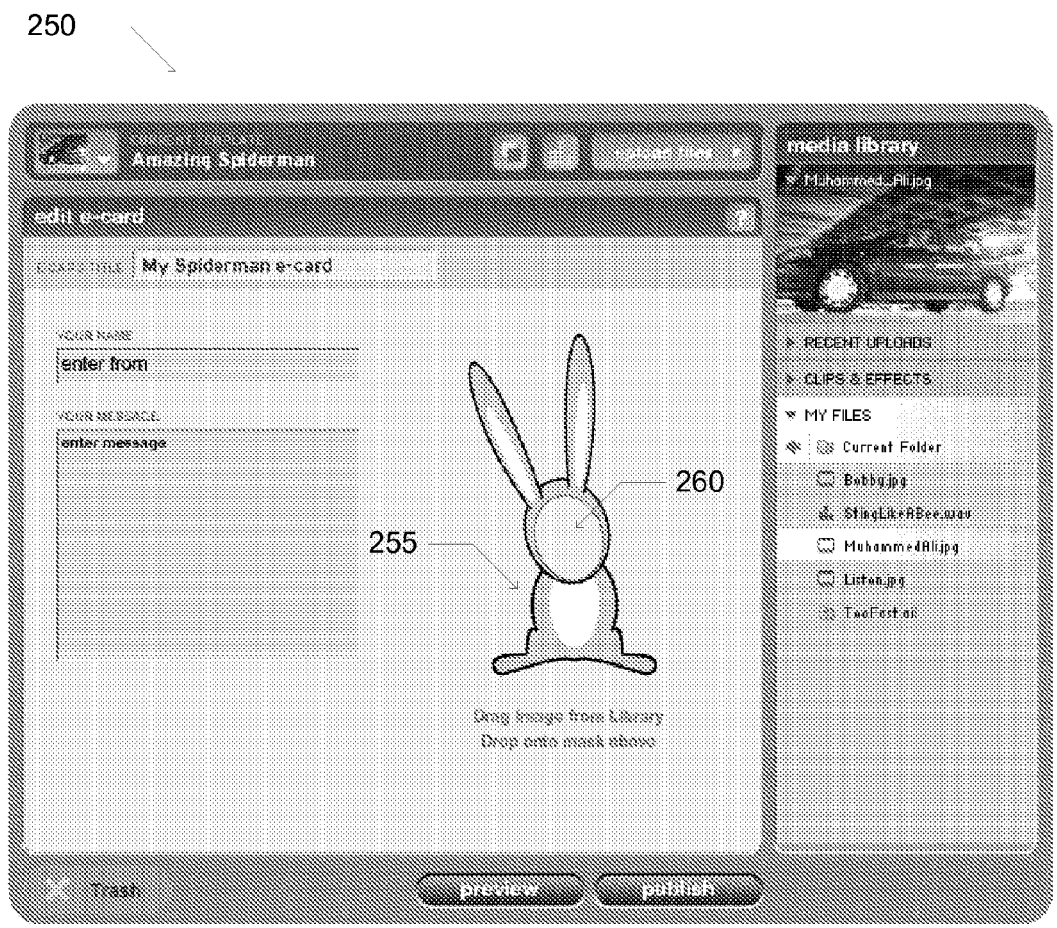
FIG. 2B shows another example of the layout and features of a template.

FIG. 2A shows an example of the layout and features of a template 200. In the template 200, a background image 205, a character body 210, and the position of the character body 210 in the template 200 are set features. The face 215 of the character is blank because the character face 215 is a media slot. A user can select an image and assign the selected image to the media slot for the face 215. FIG. 2B shows another example of a template 250. In the template 250, a rabbit character 255 has a blank face 260 representing a media slot.

A media slot has a genre and a target format. The genre indicates the type of media item that can be assigned to that media slot. For example, in one implementation, a media slot can have one of four genres: image, video, audio, or animation. Similarly, the Member Publishing service recognizes or determines a genre for any selected media item. The Member Publishing service prevents a user from assigning a media item of the wrong genre to a media slot. However, within a genre, any format of media item is acceptable. For example, for an image genre media slot, a user can select a JPG file, a GIF file, a bitmap file, or some other still image format file. The target format of a media slot indicates the format in which the template causes the media item to be requested when the media item for the media slot is to be presented. When a project is presented, the media item assigned to each media slot is retrieved and converted to meet the target format of that media slot. The conversion can be performed by the RMP server system, by the client system, or by a combination. These conversions are performed non-destructively so the original media item is preserved in the repository. In addition, these conversions are performed on the fly when the request to present a project is made. Different levels of caching of converted media items can also be provided to improve performance at the cost of storage.

The templates are grouped into categories. Templates in the same category have the same media slots but can have completely different set features. For example, referring again to FIG. 2, a second template in the same category may have a different background scene and a different character body, but still has one media slot for an image. A third template in the same category may have completely different features including multiple image features and background music, but still has one media slot for an image. The media slots in templates in the same category also have a particular one-to-one correspondence. In another implementation, there is a hierarchy of categories. In this case, templates at a lower level have the same media slots as the template above as well as additional media slots (similar to a class and sub-class relationship).

Because templates in the same category have the same number and genres of media slots, the template can be replaced with another template in the same category without reselecting media items. Returning to the example above shown in FIG. 2, if the user selects a new template in the same category, the same image media item assigned to the image media slot in the original template will be assigned to the image media slot in the new template. In an implementation having a hierarchy of categories, a template can be switched to another template in the same specific category or to a template in a parent category at a higher level. When switched to a higher-level template, media slots that are not present in the higher-level template are dropped or rendered inactive.

From a data structure standpoint, in one implementation, the project data structure has a member for the features (the set features that do not change) of the selected template and for each media slot according to the selected template. Each media slot member indicates a corresponding media slot data structure. Each media slot data structure in turn indicates a media item. When the template is changed, the media slot data structures are not changed, but instead only data structures reflecting the features of the new template are changed. In another implementation, as discussed above, when the template is switched, the data structure for each media slot, or a reference to that data structure, is passed to the corresponding media slot in the new template (e.g., the data structure for the corresponding media slot in the new template is set to store the reference to the same media item). For example, the first media slot of the original template indicates a media item assigned to the first media slot by storing a reference to a data structure indicating the media item. When a new template is selected to replace the original template, the reference for the first media slot is passed to the new template and the first media slot of the new template is set to store that reference. As a result, the first media slot of the new template then indicates the same media item as had been indicated in the original template. Various other data structure implementations are also possible.

A template can also have different versions for different platforms (e.g., computer web browser and phone web browser). Similar to templates in the same category, platform templates (i.e., different versions of a template for respective platforms) have the same genre and number of media slots and so are interchangeable, but the target format and characteristics of the media item requested can vary (e.g., requesting different resolution images to accommodate different display devices). Similarly, the layout and features between platform templates can be different. A project can list a single template and the initial connection and requests from the user system establish the platform of the user system and so which platform template to use. Accordingly, in one implementation, the details of the platform template are kept at the RMP server system while the code for the project on the user system is the same for each platform. In another implementation, some media slots include variable characteristics that are dependent on the characteristics of the platform. In this case, the requests for media items are customized by user system according to the characteristics of the user system.

In another implementation, a template also includes settable features. A settable feature controls an aspect of the presentation of a project such as background color or font characteristics. A settable feature does not have an assigned media item. As discussed above, media items are assigned to media slots. In one implementation, the settings for settable features are reflected in HTML code for the project built according to the template. The settable features in templates in the same category also match to facilitate seamless transition between templates. In another implementation, the settable features are unique to some or all templates and so do not carry over between templates in the same category. As described below, a user selects settings for the settable features while building the project. In another implementation, settable features are set automatically according to settings in a user profile.

Figure 3:
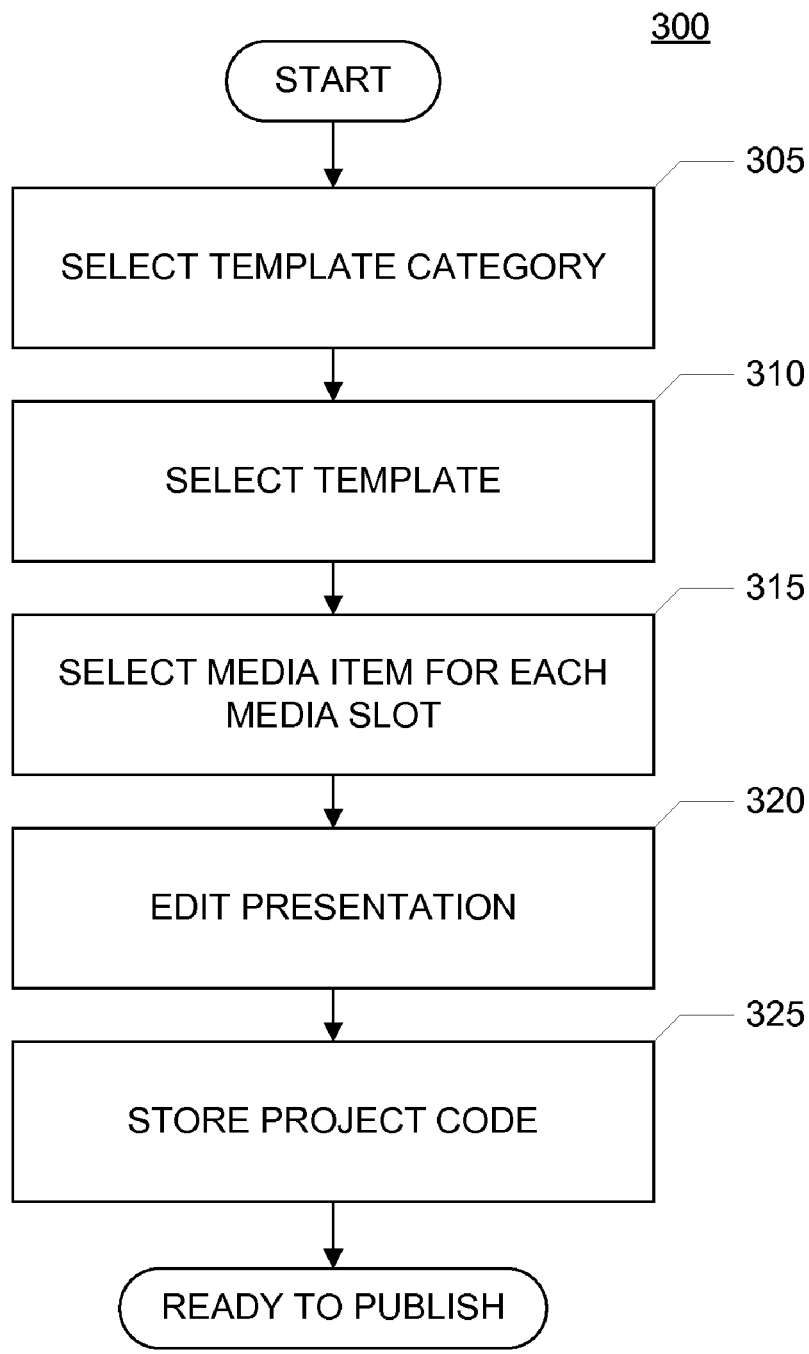
FIG. 3 shows a flowchart of one implementation of building a project.

FIG. 3 shows a flowchart 300 of one implementation of building a project. Before beginning, a user establishes a connection to the RMP server system and accesses the Member Publishing service (e.g., by navigating through a web site to a member publishing section). The user is presented with a collection of template categories and selects a category, block 305. As described above, templates in the same category have the same number and genre of media slots. In one implementation, each category represents a type of presentation with each template in the category representing a particular style of that type of presentation. Examples of categories include, but are not limited to, albums, journals, scrapbooks, music players, e-cards, and games. The RMP server system can present the categories for selection in various ways, such as in a list or a representation of folders similar to or within the repository.

After selecting a category, the user is presented with a collection of templates and selects a template, block 310.

The RMP server system can present the templates in various ways, such as in a list of thumbnail images, or a representation of folders similar to or within the repository. The RMP server system presents to the user one or more previews of how a project according to a template would appear. The user can preview multiple templates before selecting one template to use for the project. The user can also later change to another template. However, if the user changes to a template in a different category, some or all selections of media items may be lost.

After selecting a template, the user selects media items for the media slots in the selected template, block 315. The user selects a media item for each media slot in the template. The Member Publishing service supports selecting media items using various techniques, such as from a list, by entering a name, using drag and drop, or selecting from the file system representation of the repository. A user can select a default or recommended media item. A template can have a default media item assigned to one or more media slots and the user can select this default media item by not changing the assignment. A template can have one or more recommended media items for a media slot and the user can select one of the recommended media items, such as from a list. Default and recommended media items can also be established at a higher level than the template, such as for a category or for all templates. In another implementation, marketing information is used to recommend media items to users. Default and recommended media items can also be linked together into groups to form a set for the template. In addition, when switching between templates in the same category, when a default or recommended item has been selected in the original template, the default or recommended item for the same media slot in the new template can also be used (although this new item may be a different media item). Default and recommended media items are stored in the repository.

A user can select a media item stored in the repository. The Member Publishing service and the Repository service present to the user a virtual file system of media items to select from. For example, the user is presented with a hierarchy of folders of different types of media items organized by the genre and content of the media items (e.g., images of celebrities are grouped together). As discussed below, the Repository service hides the actual data storage of the media items (e.g., where media items are stored as physical files on one or more servers organized by location which determined by a hash map algorithm) and instead presents the virtual file system. The repository includes media items provided by the RMP server system, media items uploaded and stored by the user (e.g., in a virtual set of folders under "My Files"), and media items uploaded by other users and made public.

A user can upload media items to the repository through the web browser application on the user's system. The web browser supports various techniques for uploading files, such as the web folder, the upload control, and the storage tools discussed above. The user can select a media item stored on the user system and cause the upload using a native file service of the user system that interacts with the web browser or by providing a pathname to the web browser. The user can also drag and drop a media item from within the GUI of the user system to the web browser. The drag and drop support allows a user to drag and drop a media item directly into the web browser window and does not require a separate window or interface as a visual target for the drag and drop operation. In one implementation, the drag and drop support is provided through an embedded ActiveX control.

A user can also select a media item stored outside the repository. The user selects a media item from a source location, such as the user system or another network system, and the media item is uploaded to the repository. A reference to the selected item is stored in the repository (e.g., as a "virtual" media item).

While the user is selecting media items, the RMP server system presents a preview of the project with the selected media items. Alternatively, the preview is presented upon demand. In this way, the user can evaluate the choices made and change selections to improve the project. The user can also change the template while selecting media items. If the new template is in the same category as the former template, the selected media items are preserved and the user does not need to select the media items again. In an implementation supporting settable features, the user also selects settings for the settable features at this time.

As the user selects a template and media items, the user can also edit the presentation of the project, block 320. As noted above, the RMP server system presents a preview of the project. The user can adjust various aspects that the template has defined as being adjustable. The user can change the settings for settable features. The user can also adjust the presentation of media items that have an adjustable presentation style. For example, an image media slot may have an adjustable size within the template. Another type of media slot has an adjustable level of zoom or rotation for an image or an adjustable cropping portion to present different sections of the image. Another type of media slot for an audio media item has an adjustable volume or balance. The adjustments are recorded in the project and included in the request to retrieve the media item when the project is presented. The RMP server system provides the adjustments in presenting the media items as a conversion or filtering applied to the stored media item. The RMP server system returns the result to the presenting application and caches a copy of the result for future use. The original media item is not changed. Alternatively, changes can be applied by the web browser application on the user system, or a combination of changes can be applied at the RMP server system and at the user system.

As the user makes the selections and edits for the project, the RMP server system builds and updates project code for the project. The project code is code to be used by the web browser of a user to present the project to the user. The project code includes instructions according to the template and the selections and edits made by the publishing user to present the project to a user according to the publishing user's design. For some elements of the project, the project code includes instructions to the web browser on what to present, such as text or a background color. For media items assigned to media slots in the project, the project code includes requests to be sent to the RMP server system. A request indicates the target format in which the RMP server system is to provide the media item. A request can also indicate other changes or adjustments the RMP server system is to apply to the media item, such as resizing. The project code can also include instructions for the web browser for modifications to apply to the received media items, such as rotation. In one implementation, some or all of the features to be presented as part of the project are included in the project code as references to resources or code on the RMP server system. In this way, the RMP server system provides for syndication of changes, such as when templates are updated. Any changes made to the data and template underlying a project will be provided transparently to the presented project without changing the project code. The referenced resource may change, but the reference itself can be maintained.

When the user has completed editing, the RMP server system stores the project code, block 325. The RMP server system provides storage for a user to preserve projects that have not yet been published. The user can return to the project for further editing at a later time. When the user has finished editing a project, the user can publish the project. The user can later retract a published project or a copy of a published project to the workspace area for modifications.

Figure 4:
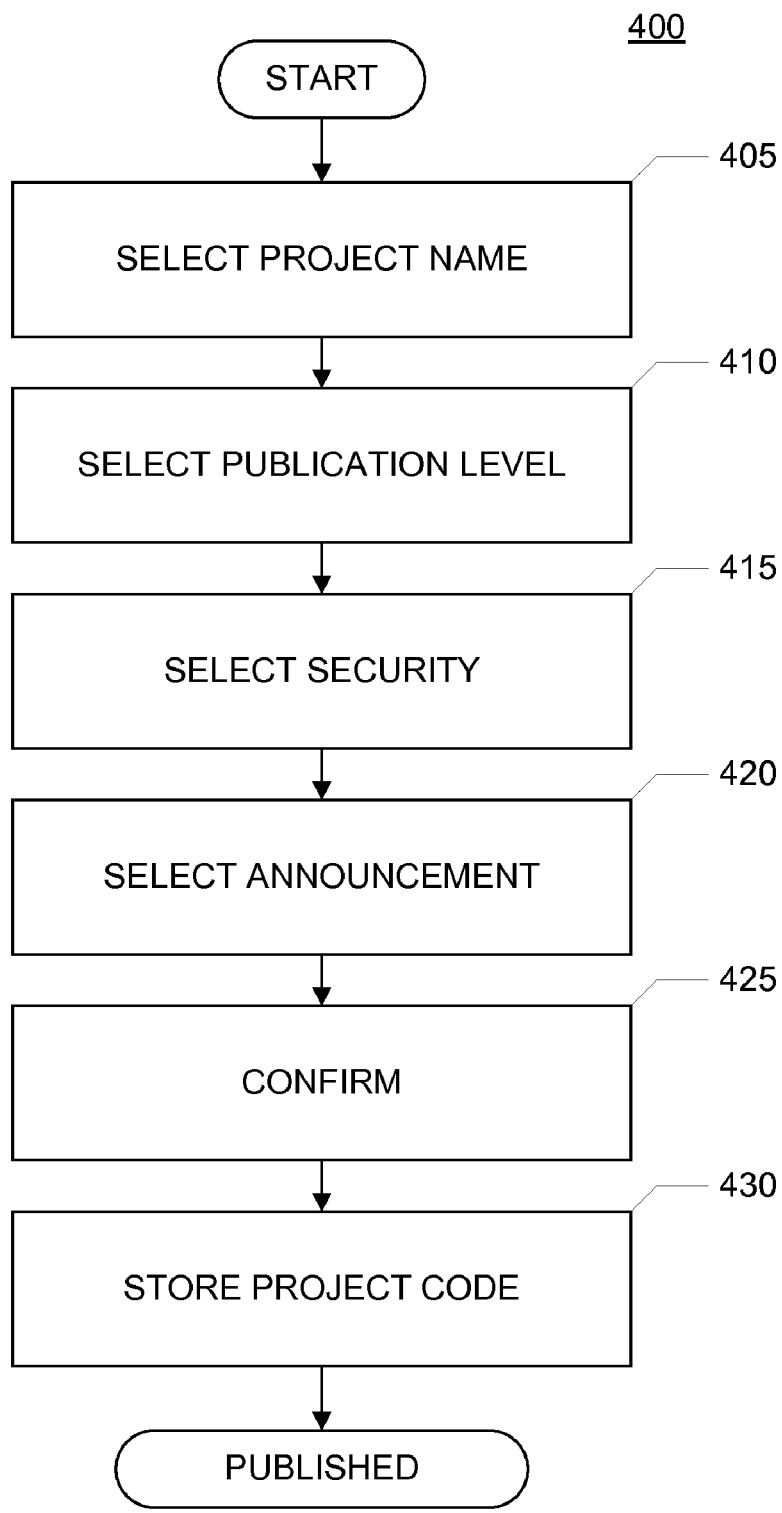
FIG. 4 shows a flowchart of one implementation of publishing a project.

FIG. 4 shows a flowchart 400 of one implementation of publishing a project. After a user has finished making selections and editing the presentation of a project, the user can publish the project so that other users can access and experience the project. The user selects or enters a publishing name for the project, block 405. The publishing name is the name that will be used for other users to access the published project. In one implementation, the publishing name is part of a URL provided to users to access the published project.

The user selects a publication level for the project, block 410. The publication level indicates a range of users that will have access to the project. At a public level, any user with access to the RMP server system will be able to access the project. In one implementation, the RMP server system provides galleries of projects including a public gallery of projects that are available to users of the RMP server system. At a subscriber level, users that are subscribers to the RMP server system services will be able to access the project. At another level of access, a defined group of users can access the project. In an implementation supporting galleries, the RMP server system provides personal galleries for users where the user can define which other users are allowed to enter the user's personal gallery and access projects within that gallery. The RMP server system can also provide other levels of access, such as limited to the user only, limited to users with an invitation from the publishing user, or limited to premium subscribers.

The user can also select a security level for the project, block 415. The security level restricts access within a publication level. For example, a user can assign a password to a project so that only users that enter the proper password can fully access the project. In one implementation, a user without the password can access a preview of the project, but cannot fully access the project. The RMP server system can support various types of security mechanisms, such as digital signatures.

The user selects how to announce the published project, block 420. The RMP server system provides an email notification system for new projects. In one implementation, the email announcement includes a URL to access the project. The recipient can then activate the URL (e.g., click on it) to proceed directly to the project. The user selects or provides one or more email addresses to receive a notification of the newly published project. In one implementation, the user provides email addresses from an email application program on the user system. In another implementation, the RMP server system maintains an email directory of subscribers to the RMP server system to facilitate notifications. In another implementation, the RMP server system provides a newsletter or news service to subscribers and the user can select whether to include a notice in the news service of the publication or not, as well as what kind of notice.

After reviewing the selections made for publication, the user confirms the selections, block 425. Once the confirmation has been received, the RMP server system stores the project code in storage for published projects and establishes access and security according to the user's selections, block 430. The RMP server system also provides notifications as indicated by the user's selections.

Figure 5:
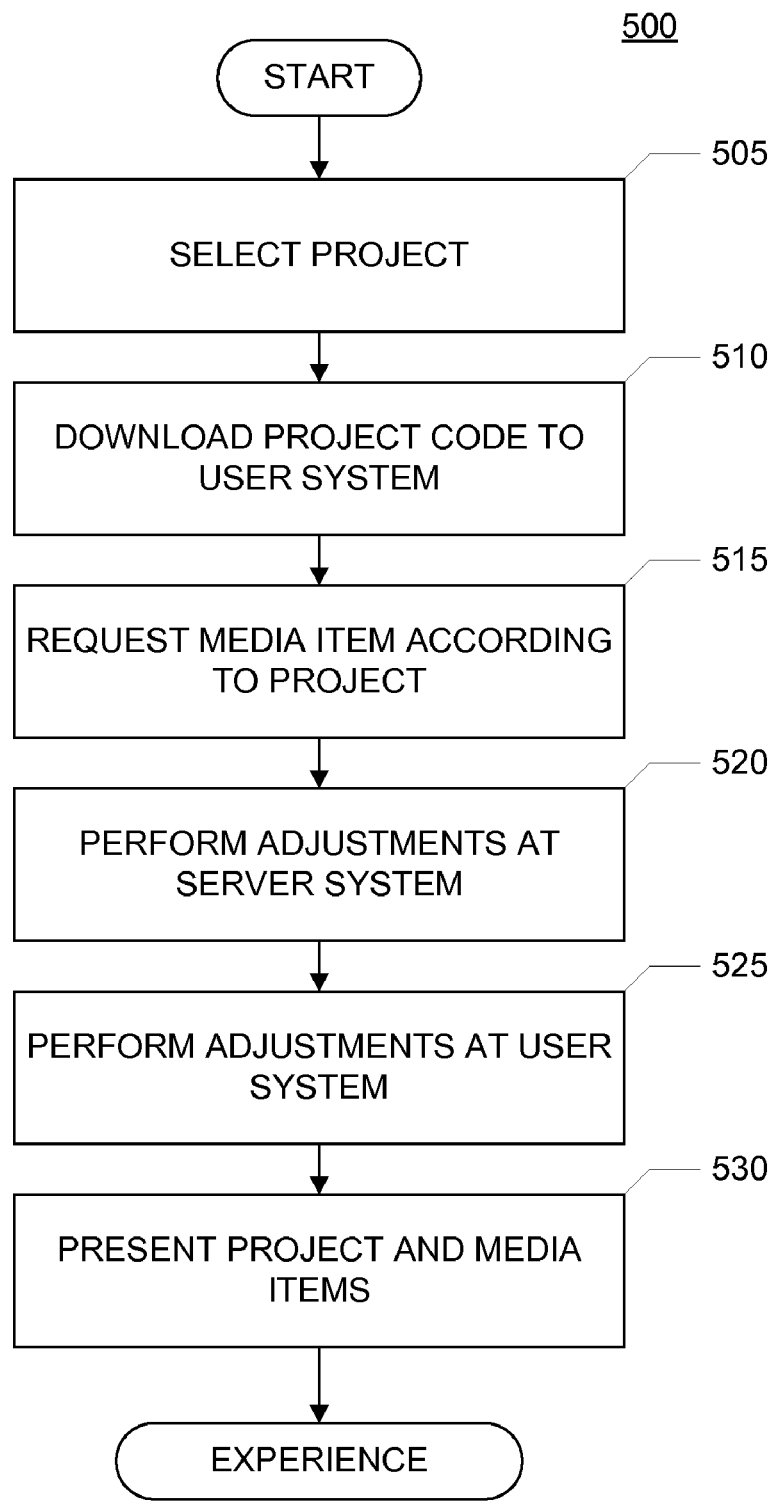
FIG. 5 shows a flowchart of one implementation of accessing a published project.

FIG. 5 shows a flowchart 500 of one implementation of accessing a published project. Once the project has been published, users with the appropriate level of access and providing the appropriate security can access the project. A user accesses the RMP server system and selects a project to experience, block 505. A user can browse through public collections or galleries of projects or personal galleries that are open to the user. A user can also request a particular project, such as by name. If a user has received a URL for a project, the user can access the project directly using the URL without navigating through the RMP server system web site.

After selecting the project, the web browser at the user's user system downloads a copy of some or all of the project code for the project, block 510. The project code is the code built and stored by the RMP server system when the publishing user built the project. The project code includes instructions for the web browser to present the project including downloading media items. The web browser does not necessarily immediately download all the media items assigned to the project. The web browser can request and download the media items on demand as the project is presented.

As media items are to be presented in the project according to the user's actions and the project code, the web browser requests media items from the RMP server system, block 515. The project code includes a media item request for each media item assigned to the project. A media item request indicates the media item, the target format, and any modifications the RMP server system is to apply to the media item according to the characteristics of the settings of the media slots. As discussed above, media items can be presented as they are in storage, in a different format, or adjustments can be applied to the media item. For example, an image media slot in the project that has a target format of JPEG sends a request to the RMP server system for the media item to be presented as a JPEG media item. If the media item assigned to that media slot is in fact a different format, such as a GIF media item, the RMP server system applies a filter to convert the GIF item to a JPEG item and sends the JPEG item to the requesting user system. The request can also include additional adjustments to the media item, such as resizing.

When the RMP server system receives a media request from the web browser, the RMP server system retrieves the indicated media item and applies the appropriate modifications, block 520. The RMP server system maintains a cache of generated adjusted media items. The RMP server system first checks if there is already a copy of a media item matching all aspects of the request in the cache. If so, the RMP server system does not need to perform further modifications and returns a copy of the cached item. If not, the RMP server system retrieves the original media item from the repository. The RMP server system checks if the media item is in the format requested as the target format. If not, the RMP server system applies a filter to generate a new copy of the media item in the target format. If the request includes additional modifications to be applied to the media item, such as resizing, the RMP server system applies the additional modifications to the filtered media item to match the request. The RMP server system returns the adjusted media item to the user system and stores a copy in the cache.

In one implementation, the RMP server system also checks the cache for partial matches to the request. In this case, if the cache includes an item that matches part of the request without additional modifications, the RMP server system retrieves that item and applies the remaining modifications to match the request. For example, where the request is for a JPEG image at a particular resolution, the RMP server system checks the cache and determines that there is not a JPEG image at that resolution for the indicated media item in the cache, but determines that there is a JPEG image at a different resolution for the indicated media item in the cache. Instead of retrieving the original media item, which may be in a different format and could require a filter to be in JPEG format, the RMP server system applies an adjustment to change the resolution of the cached item to match the request, creating another copy in the cache. The RMP server system returns the new adjusted media item matching the request. The RMP server system can use a priority system to determine which partial matches to use. In another implementation, the RMP server system determines whether it is better (e.g., faster) to undo one or more changes that have been applied to a cached copy and then work forward rather than starting from the original media item or from a cached copy that fewer changes applied.

In one implementation, the RMP server system provides the media item to the web browser through a secure connection or using security measure to control access. The RMP server system can use encoding for some or all media items sent to the user system (e.g., encoding items that are not free). The RMP server system can also use access links that have a limited lifespan so that a request for the same media item will need to use a new access link after a period of time. As part of accessing the project, the web browser receives and updates the access links to maintain fresh links.

After the user system has received the media item matching the request from the RMP server system, the web browser applies any additional changes indicated by the project code to the received media item, block 525. As discussed above, the project code can indicate that some modifications to a media item are to be applied by the web browser rather than at the RMP server system. For example, the project code may indicate that, after the web browser receives the media item from the RMP server system, the web browser is to apply changes such as rotation, clipping, brightness adjustment, or volume adjustment. The web browser follows a similar pattern to download and adjust any other media items as indicated by the project code.

After applying any local adjustments, the web browser presents the project and media items to match the project code, block 530. Some aspects of the project do not require media items to be downloaded and are generated at the user system, such as fonts and colors. As the user interacts with the project through the web browser, the project code may indicate modifications are to be applied resulting in local adjustments made by the web browser, new media item requests for the RMP server system, or combinations thereof.

In another implementation, layout information and features of the project other than media items are also stored as requests in the project code so that these items are also downloaded from the RMP server system. In this way, changes can be made at the RMP server system to templates or media supporting templates (e.g., background images or music) and these changes will appear in all projects using the templates as a result of the requests being sent back to the RMP server system.

In one implementation, the web browser and target formats used for media items protect the media items from unwanted copying (unwanted from the publishing user's or content owner's point of view). In one implementation, the rendering functionality of the web browser does not present any copy or save facility to a user. So the user can view the images and video of a presentation, but the web browser does not directly support preserving the media items. A similar approach can be used with audio media items. In this way, it is difficult for users to make unauthorized copies of media items presented in projects. This extra security may make it more desirable for content providers and users to upload or provide access to content to be included in projects.

In one implementation, the RMP server system provides a code publishing service. A user can download a copy of the project code for a project and include that project code in any network accessible location. The user (or another user) can then access the stored project code and experience the presentation without downloading the project code from the RMP server system. The RMP server system will still be involved in the presentation because the media items assigned to the project are stored on the RMP server system, as well as some features of the project (e.g., template layout).

In one implementation, the RMP server system supports searching for media items, templates, or other available data. The searching can apply to data provided by the RMP server system or to data uploaded to the RMP server system by the user, another user, or a content provider.

In one implementation, the searching returns results that are context sensitive. In one implementation, the search engine filters the results according to a user profile. Some media items available to the users are not available for free. A user profile may specify a price limit for search results. Some media items are available to users according to their subscription level. A user profile may indicate only to return search results that are at a certain subscription level. Alternatively, the search engine may return only those results that are at the user's subscription level.

In another implementation, the search engine provides a preview feature. The search engine allows a user to select a search result and retrieve a preview of the indicated item, such as a thumbnail of a template or image, or a short segment of a video or audio item. This preview may be provided for a pay item before the user purchases the media item for inclusion in a project.

As discussed above, the repository is a storage system for the media items available to and used in projects built and published through the RMP server system. The repository can be implemented as one or more storage devices using one or more databases. In one implementation, each type of media item is stored in a respective storage device (e.g., JPEG images on one storage device, MP3 files on a second storage device, streaming media on another storage device, and so on). The repository maintains information about the stored media items to present a virtual hierarchical file system to the user so that the user can easily access, move, add, and delete (etc.) media items according to a hierarchical organization. The user can create and delete folders in the repository and the RMP server system will present the media items according to these folders even though the actual storage organization in the repository may be quite different.

In addition, each user can have a different view of the data in the repository as the users build different file structures, such as through the creation and modification of virtual folders. Users can also customize the presentation features, such as types of folders, colors, etc.

The RMP server system also stores data in one or more databases and/or files to support the operation of the web site. This data is referred to herein as producer data. Producer data includes data to implement the templates, other than the media item data stored in the repository. Producers can access and modify media data in building and modifying templates.

As described above, the RMP server system 105 is supported by a client-side Content Management Services (CMS) tool, which allows producers to access and manage the producer data and any media data needed for development. The CMS tool works with a multi-environment publishing pipeline to control access to and distribution of producer data as it is being developed. For example, one publishing pipeline supports three environments: a developing/production environment, a staging environment, and a live environment. Each environment maintains a separate store of data. When a producer begins work on a template, for example, the producer creates and edits the template and associated data in the development environment. When the producer has completed the development work, the producer migrates the template and data to the staging environment. A complete copy of the data is brought to the data storage of the next environment. In the staging environment, the template and data are tested and reviewed. When the template and data are approved, they are migrated to the live environment. Again, a complete copy of the data is brought to the data storage of the next environment. In the live environment, users can access the template and data for member publishing. Back-end constraints are provided to insure that database conflicts are avoided from environment to environment.

In one implementation, producers are restricted to accessing data only in the development environment. Any changes made are submitted as updates up through the pipeline. As updates are moved upward, the updates are applied to the versions of data stored for each environment. In one implementation, the entire data set is not migrated upward, but only the data or files that have been marked as modified.

In another implementation, a different number of environments are supported, such as two, or four, or more. The number is customized to the goals of the RMP server system, producers, and users.

In another implementation, the RMP server system provides simultaneous support for publishing of database items and physical files, using the same user interface protocols. To a producer using CMS, database items are published in the same manner, e.g., with the same "PUBLISH/DELETE" flags for all items shown in the UI. The list of physical files to be published is constructed using a method that traverses both source and destination file system trees, producing a list of differences that is displayed to the producer as files to be PUBLISHED or DELETED. This list is a selectable list of publishable physical files.

In another implementation, a producer can preview data through the CMS. A producer can preview a specific piece of producer content or a specific physical file directly from the content management system (e.g., style sheets and JSPs, allowing a WYSIWYG preview of *ML content). In one implementation, the CMS tool provides a "Preview" button or supports a "double-click" of a particular item (e.g., for previewing items listed in the "Content" or "Tips and Tricks" tabs in the illustrated figures below). The preview automatically launches the appropriate application or browser needed to see the content/file, and automatically performs the necessary transformations on internal markup language strings, using configuration settings and paths, allowing that content to reference other content elements correctly. The producer can then avoid having to access the content separately using the end-user rendering system.

Figure 6:
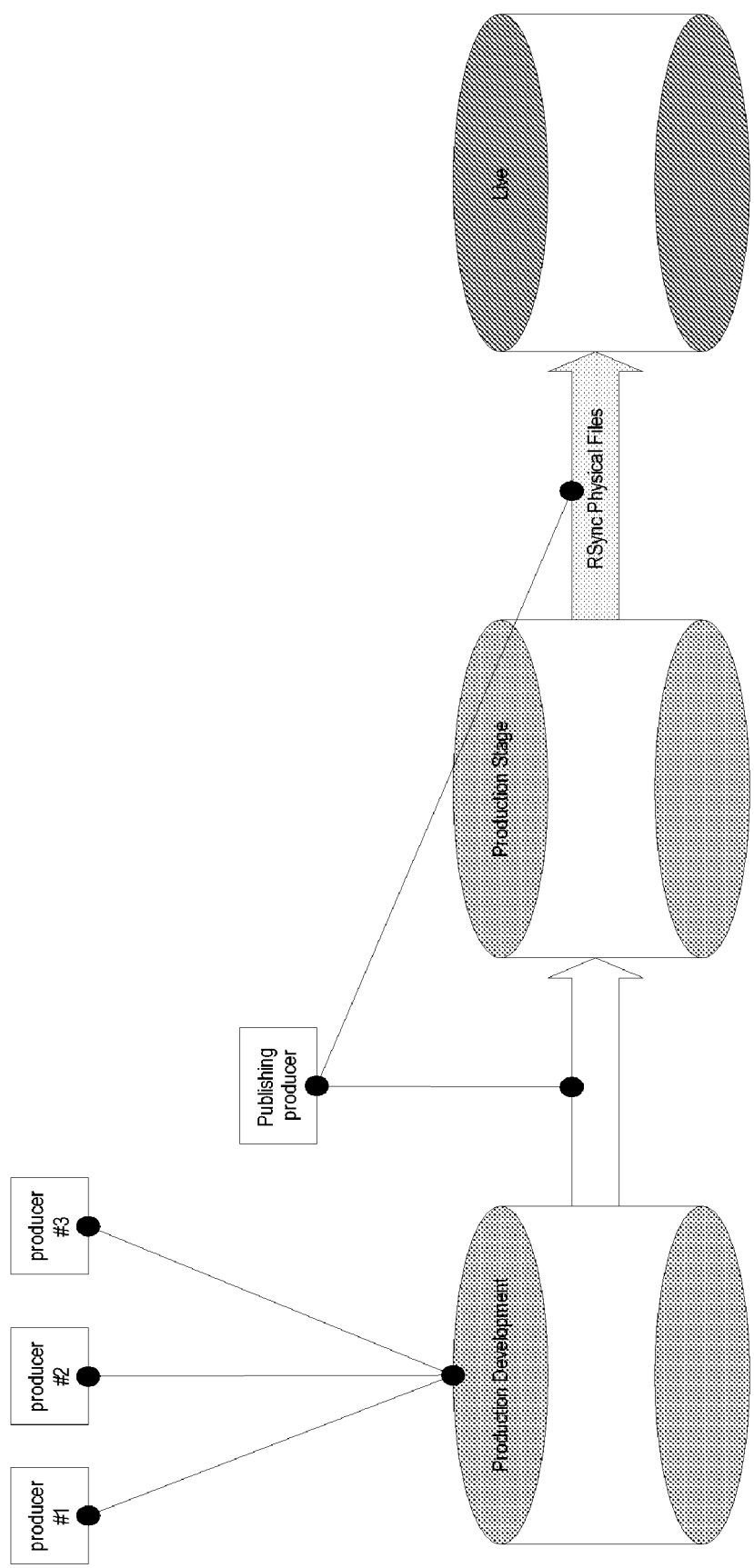
FIG. 6 illustrates one implementation of a publishing pipeline configured for an RMP environment.

FIG. 6 illustrates one implementation of a publishing pipeline configured for an RMP environment. In the illustrated implementation, the publishing pipeline includes three environments: a production development environment, a production stage environment, and a live environment. The production development environment is the production team's primary build environment. This is where the production team develops new pages and tries out new designs and graphics. The production stage environment is the production team's primary staging environment. This is where the production team "stages" new builds with the newest content intended to be pushed to the "Live" site or live environment. In one implementation, the live environment is the final user site located at 'www.screenblast.com' and will require special security permissions in order for the publishing tool to connect to it.

In one implementation, the CORE CMS is a .net tool written for producers to push new content though the publishing pipeline onto the live site. The CORE CMS lets producers import new content into the CORE CMS tables within the live site (e.g., Screenblast database). Further, the CORE CMS associates files with specific metadata depending on its type. When a producer imports new content into the tool, that content is flagged as 'dirty' (all new and modified items automatically gets this flag assigned) to allow the system to differentiate between items that need updating. The flagging also allows the CORE CMS tool to determine which items to push to the target environment.

Figure 7:
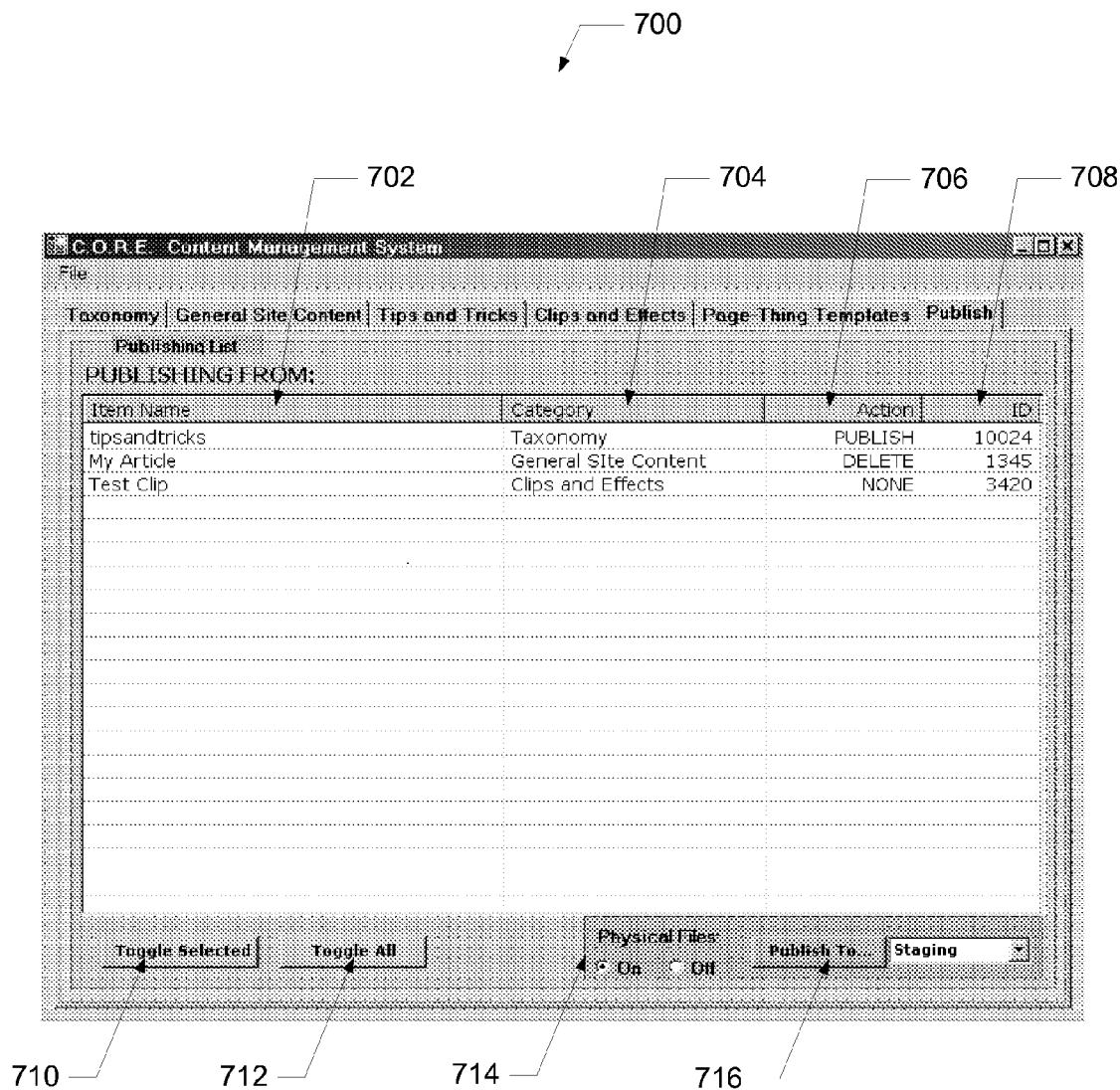
FIG. 7 shows one implementation of the publishing tab window in the CORE CMS tool.

FIG. 7 shows one implementation of the publishing tab window 700 in the CORE CMS tool. In the illustrated implementation, there are three items selected by the producer. For each item, the following columns are displayed: Item Name 702, Category 704, Action 706, and ID 708. The Item Name 702 is the business name for the media item. The Category 704 is the target area of the site where the media item will show up. The Action 706 shows the selected action of the media item. In one implementation, the selected action includes "publish", "delete", and "none". The "publish" action indicates that the media item is scheduled to be published (i.e., Dirty Boolean is set in the source database). The "delete" action indicates that the media item is scheduled to be deleted (i.e., Delete Boolean is set in the source database). The "none" action indicates that no action is being taken for the selected item (i.e., the media item is ignored and is not part of the publishing process). The ID 708 is a primary key for the database item representing the media item.

The illustrated implementation also includes the 'Toggle Selected' button 710 that changes the selected media item's Action state into one of two states of the three states listed above. If the item is marked for deletion, the item can be toggled between 'delete' and 'none'. If the item is marked for 'publish', it can be toggled to 'none'. The 'Toggle All' button 712 changes all media items' Action state into one of two states (current action state, or 'none') of the three states listed above. The 'Physical Files' radio button 714 determines whether to publish the selected media items with their corresponding files (through 'rsync') to the destination environment, or to simply publish the database items without performing an 'rsync' operation. The 'Publish to' drop down menu 716 allows the user to select the target environment for the publication.

Figure 8:
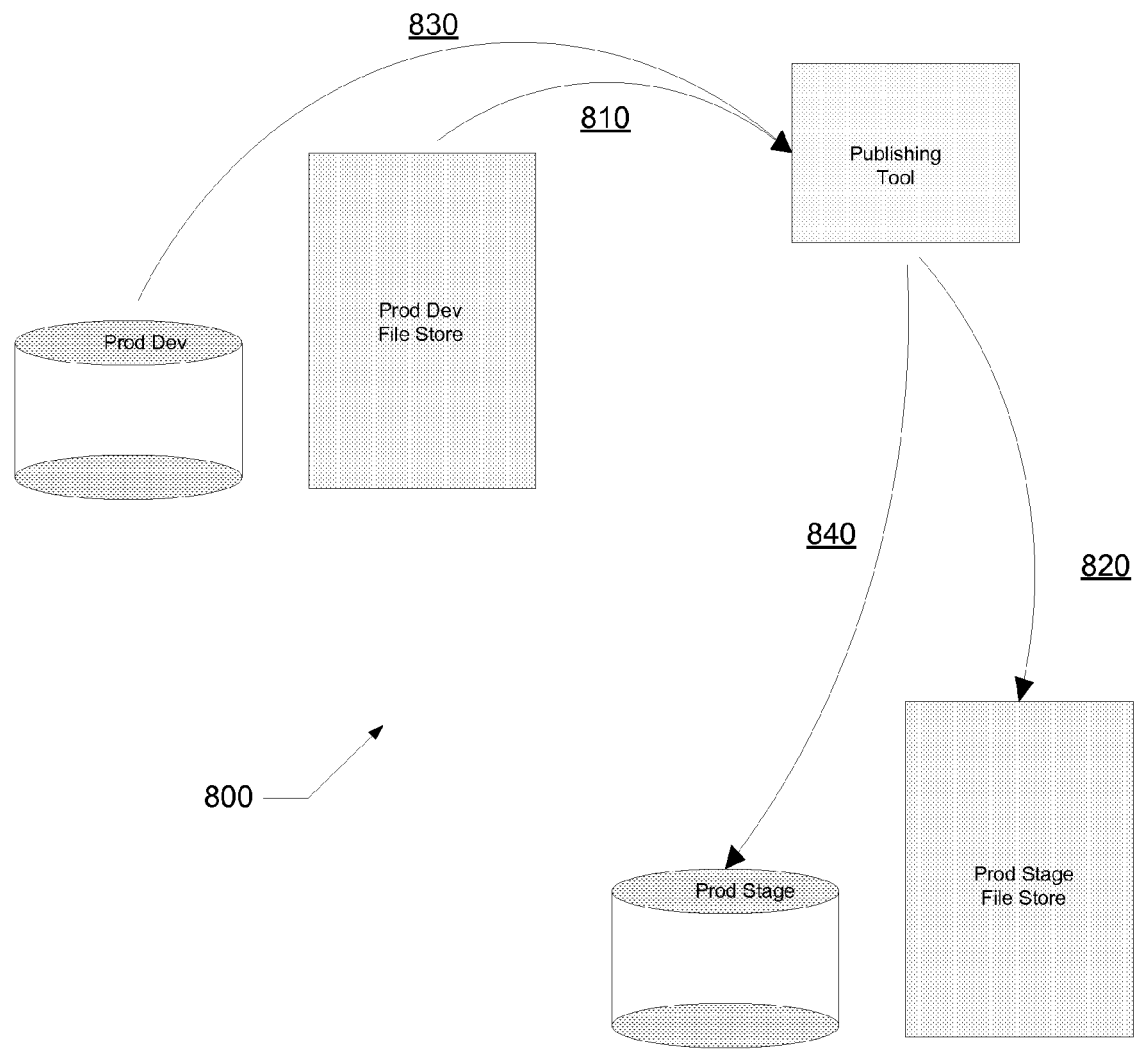
FIG. 8 shows a simplified illustration of a publishing process in accordance with one implementation.

FIG. 8 shows a simplified illustration of a publishing process 800 in accordance with one implementation. In the illustration, the CORE CMS tool completes the physical file transfer (including file upload complete verification) before the tool initiates the database record publishing onto the target environment. In the publishing process 800, each file is copied from the source file store, and uploaded to the target store, at 810. At 820, the CORE CMS tool verifies each file at the target. The verification ensures data integrity when the database records are published. Each selected media item record is read from the source database, at 830. Each selected media item record is then written to the target database, at 840.

Figure 9:
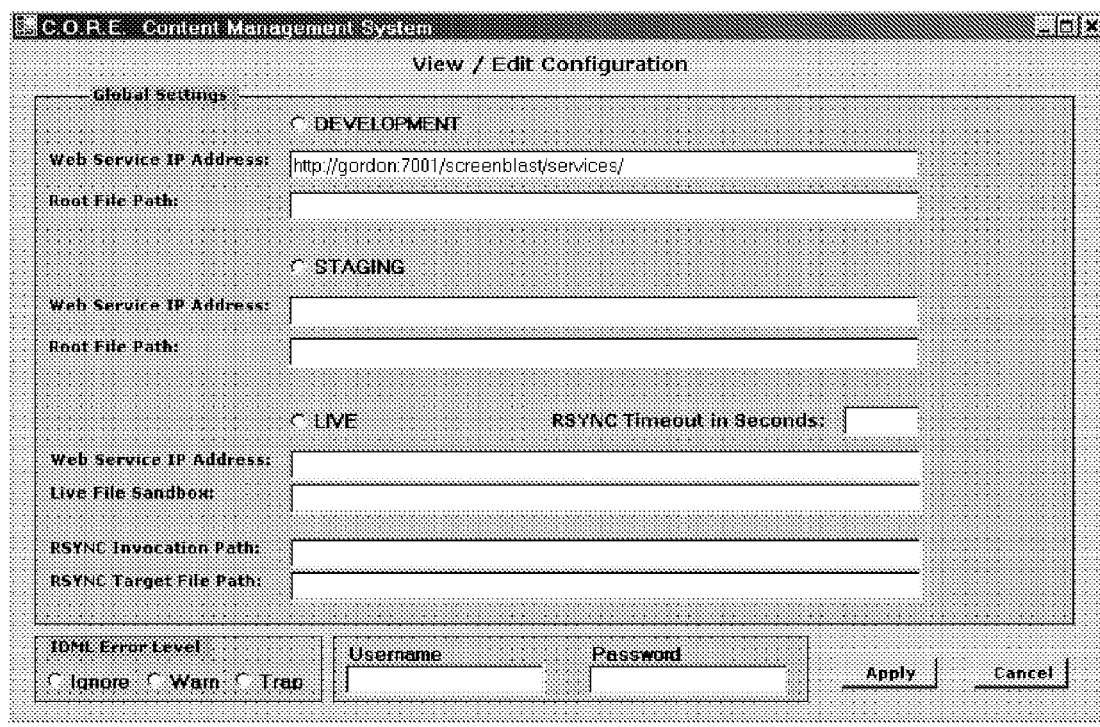
FIG. 9 shows one implementation of the global settings for source/destination environment configuration of the CORE CMS tool.

FIG. 9 shows one implementation of the global settings for source/destination environment configuration of the CORE CMS tool. In this implementation, editing is only done on the development environment and the only access that content developers will have to the staging or live environment is through the publishing pipeline. The global settings screen allows entry of web service IP addresses and/or file paths for the production development environment, the production stage environment, and the live environment. The settings screen also allows entry of the 'rsync' timeout period, the IDML error level, and the user name and password.

As mentioned above, the CORE CMS is a tool for content management that allows a producer on a publishing team to manage Taxonomies and editorial content of various types for CORE-based websites. The term "Taxonomy" used in this context refers to classification of media contents. When published, this content can then be viewed and interacted with by end-users, with the CORE system being used as a framework to display content for user consumption.

In one implementation, the CORE CMS is a .net based client-side application, intended to run under Windows, and interfaces directly with back-end CORE services through Simple Object Access Protocol (SOAP), allowing a publisher to access, view, and modify one or more databases that adhere to the CORE CMS database specifications.

Figure 10:
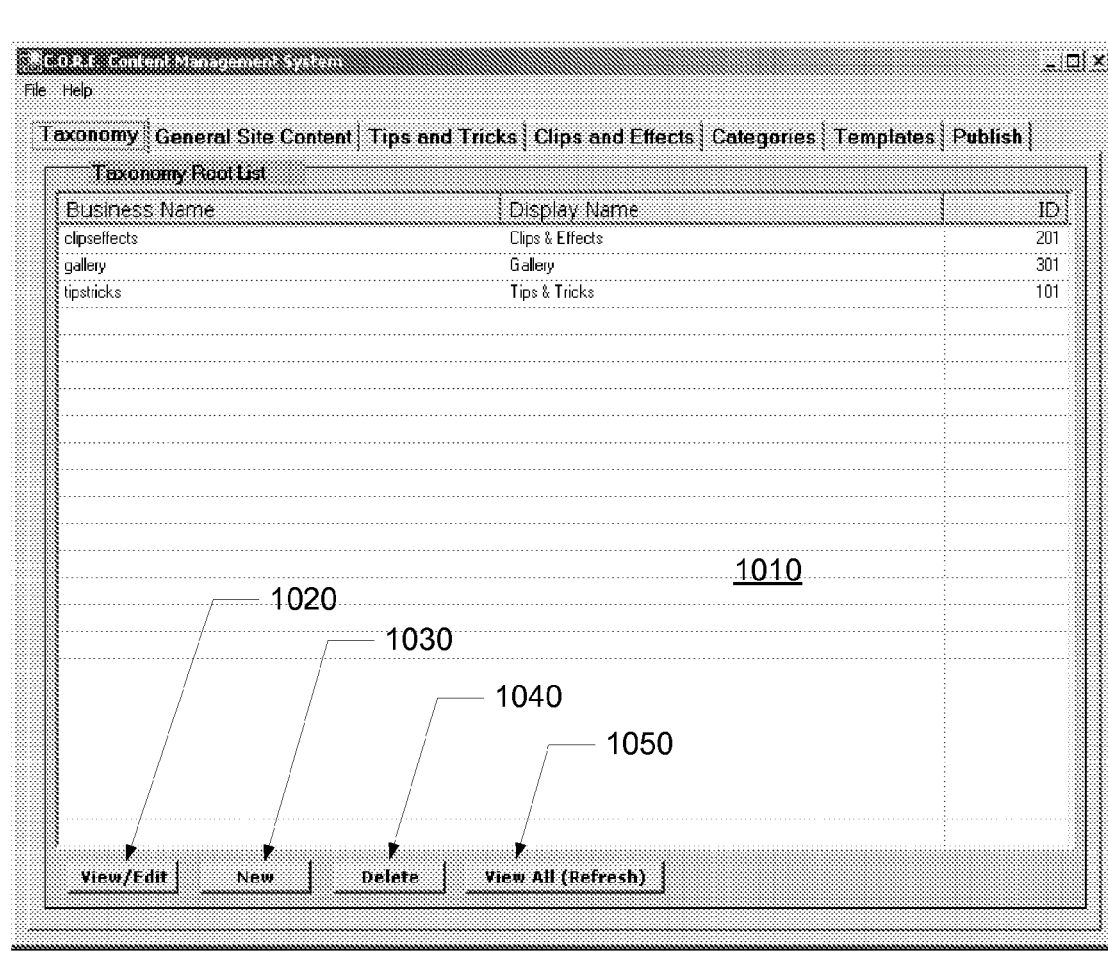
FIG. 10 shows one implementation of a Taxonomy tab window of the CORE CMS tool.

FIG. 10 shows one implementation of a Taxonomy tab window 1000 of the CORE CMS tool. Taxonomies are created by the site/content developer, and are the elements of the CORE system that define the overall dynamic site content structure. In the illustrated embodiment, the Taxonomies are stored in the database as a flat table of individual nodes that have parent links (through paths) and associated data, such as business name, display name, etc. The nodes in a particular Taxonomy can reference other nodes. However, if no parent node is referenced via the "path", the node is considered a "root" node. The Taxonomies are referenced by other content components. Furthermore, for the site end-users, the Taxonomies allow the browsing of the content in a meaningful way. Thus, the CMS user does not need to worry about "paths", as these are constructed for the user based on the items generated or edited in the Taxonomy editor described below.

The Taxonomies List interface shows all of the root taxonomy nodes in a particular database, with links to editing interfaces, as well as giving the ability to add selected taxonomies to a publishing list. The "Search/Edit" area of the interface also allows the user to filter the list display based on search criteria, and to view, edit, or create Taxonomies within the database.

In the illustrated implementation, the Taxonomy tab window 1000 also includes a list box 1010, a view/edit button 1020, a new button 1030, a delete button 1040, and a view all button 1050. The list box 1010 displays all of the Taxonomy root nodes in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category by clicking on that category. Clicking again in a particular category causes the items to be sorted in reverse order.

The view/edit button 1020 brings up the "View/Edit" interface (see FIG. 11) for the selected item in the list box 1010. If no items, or multiple items are selected, this button 1020 has no effect. Double-clicking an item in the list box 1010 has the same effect as clicking this button 1020.

The new button 1030 brings up the "New" interface for creating new Taxonomies in the database. This interface is identical to the "View/Edit" interface 1100, with the exception of the header, which reads, "Create New Taxonomy". A default name is shown, and the Taxonomy Tree window is initially empty except for the named default root node. Attempting to save with the same name as an already existing Taxonomy is not allowed.

Figure 13:
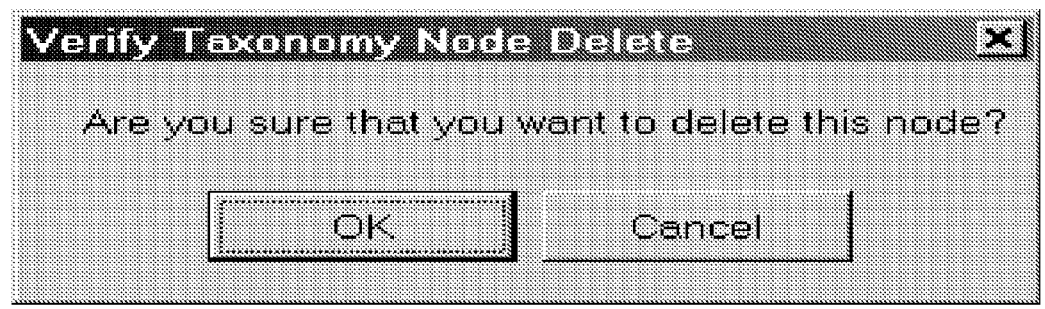
FIG. 13 illustrates a confirmation prompt to protect the user against inadvertently deleting items by mistake.

The delete button 1040 deletes all selected Taxonomies in the list box. Before deletion, a confirmation prompt (see FIG. 13) appears to protect the user against inadvertently deleting items by mistake. If other media items reference a node in the selected taxonomy, a "Cancel/Confirm" prompt will appear, and if "Confirm" is selected, the other media item(s)'s reference(s) to that deleted taxonomy's nodes will be removed.

Sometimes changes are made from more than one instance of the CMS. This means that it is possible, under rare conditions, that the list box 1010 does not correctly represent the current state of the database. The view all button 1050 forces a complete refresh of the taxonomy root-node list, based on the current state of the database.

Figure 11:
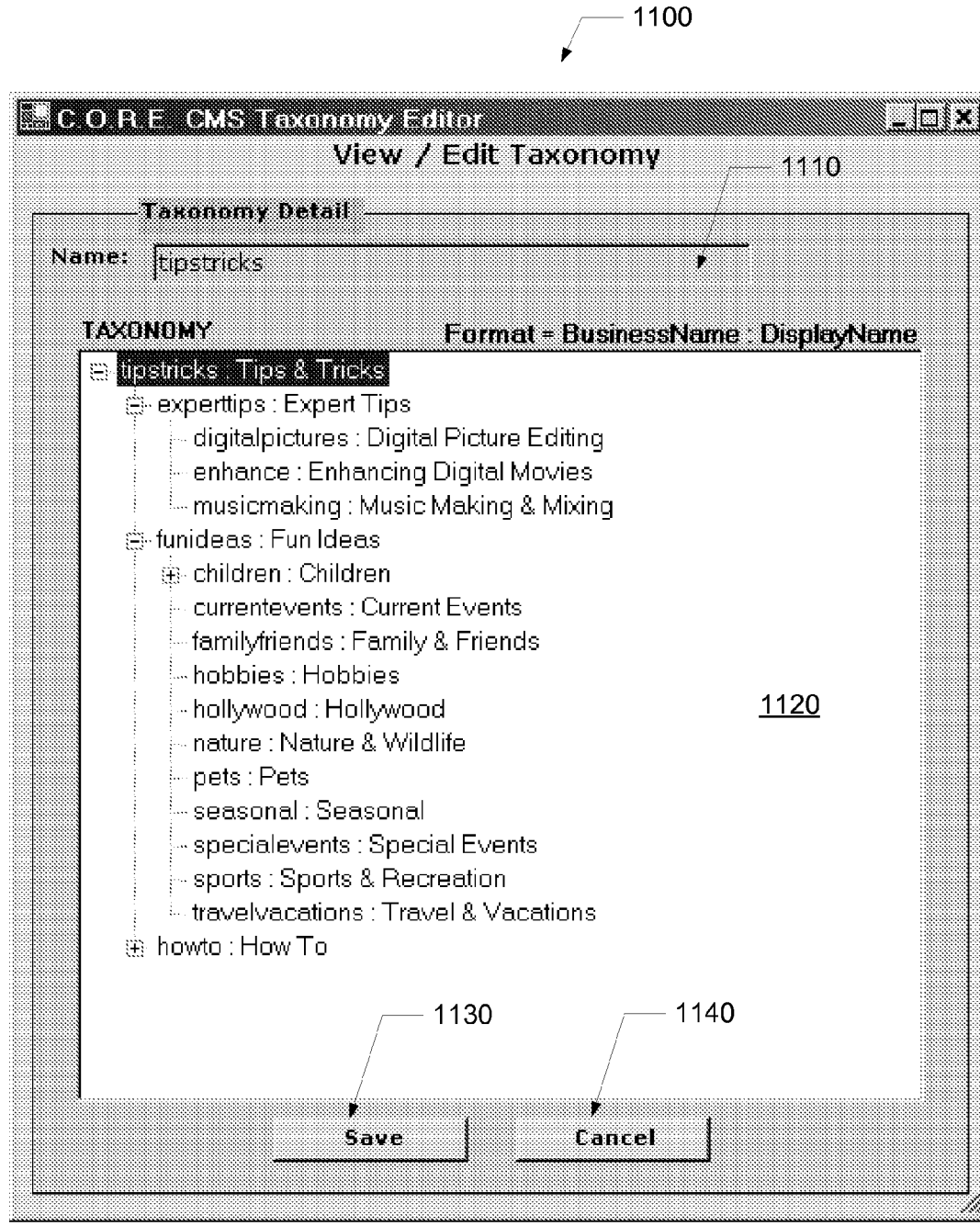
FIG. 11 shows one implementation of the "View/Edit" interface for the selected item in the list box.

FIG. 11 shows one implementation of the "View/Edit" interface 1100 for the selected item in the list box 1010. This interface 1100 allows the detailed information in an individual Taxonomy tree to be viewed and edited. When saved, these Taxonomies are stored in the database as a collection of individual Taxonomy Nodes with the associated data, such as business name, display name, parent path, etc. The "View/Edit" interface 1100 includes a name field 1110, a Taxonomy edit window 1120, a save button 1130, and a cancel button 1140.

The name field 1110 is not directly editable. The field 1110 shows the business name of the "root" node of the taxonomy tree. If the name of root node is changed through the Taxonomy Node Edit interface, this field is automatically updated to reflect that change.

The Taxonomy editing window 1120 serves as an editor for the Taxonomy. If a new Taxonomy is being created, this window 1120 is initially left blank, except for the root node, whose name corresponds with the "Name" field. Like almost any tree browser, nodes with children may be expanded or contracted by clicking on the associated "+" and "−" symbols next to the named nodes. An individual node may be selected, and actions on a node may be performed by right clicking with the mouse and selecting the action from the pop-up menu. The actions include 'new', 'edit', 'cut', 'copy', 'paste', and 'delete'.

The 'new' action creates a new child node under the selected (parent) node. The 'edit' action edits the selected node's business name and/or display name. The 'cut' action removes and stores the selected node for pasting elsewhere. The 'copy' action stores the selected node for pasting elsewhere without removing the node. The 'paste' action adds the most recently cut or copied node as a child. The 'delete' action removes the selected node.

The save button 1130 causes the CMS to perform a save to the database of the entire taxonomy's node data. If creating a new taxonomy, the saving over an existing named taxonomy is not allowed. If editing an existing taxonomy, and the taxonomy business name has been changed, the tool launches a confirmation pop-up if attempting to save over an existing named Taxonomy. Otherwise, the save is performed automatically, the View/Edit interface 1100 is closed, and a "Taxonomy Tree Successfully Saved" message appears in the header of the main interface.

The cancel button 1140 closes the Taxonomy View/Edit interface 1100 and returns the user to the main interface. Changes that may have been made in the View/Edit interface 1100 are not saved.

Figure 12:
FIG. 12 shows one implementation of the new/edit interface.

FIG. 12 shows one implementation of the new/edit interface 1200. This "mini" editing interface 1200 enables creating or editing individual nodes of a Taxonomy tree. The Business Name is for internal use only, and is used during path construction, whereas the Display Name is what appears to an end-user while browsing a dynamic site that was created with CORE and the CMS.

Figure 14:
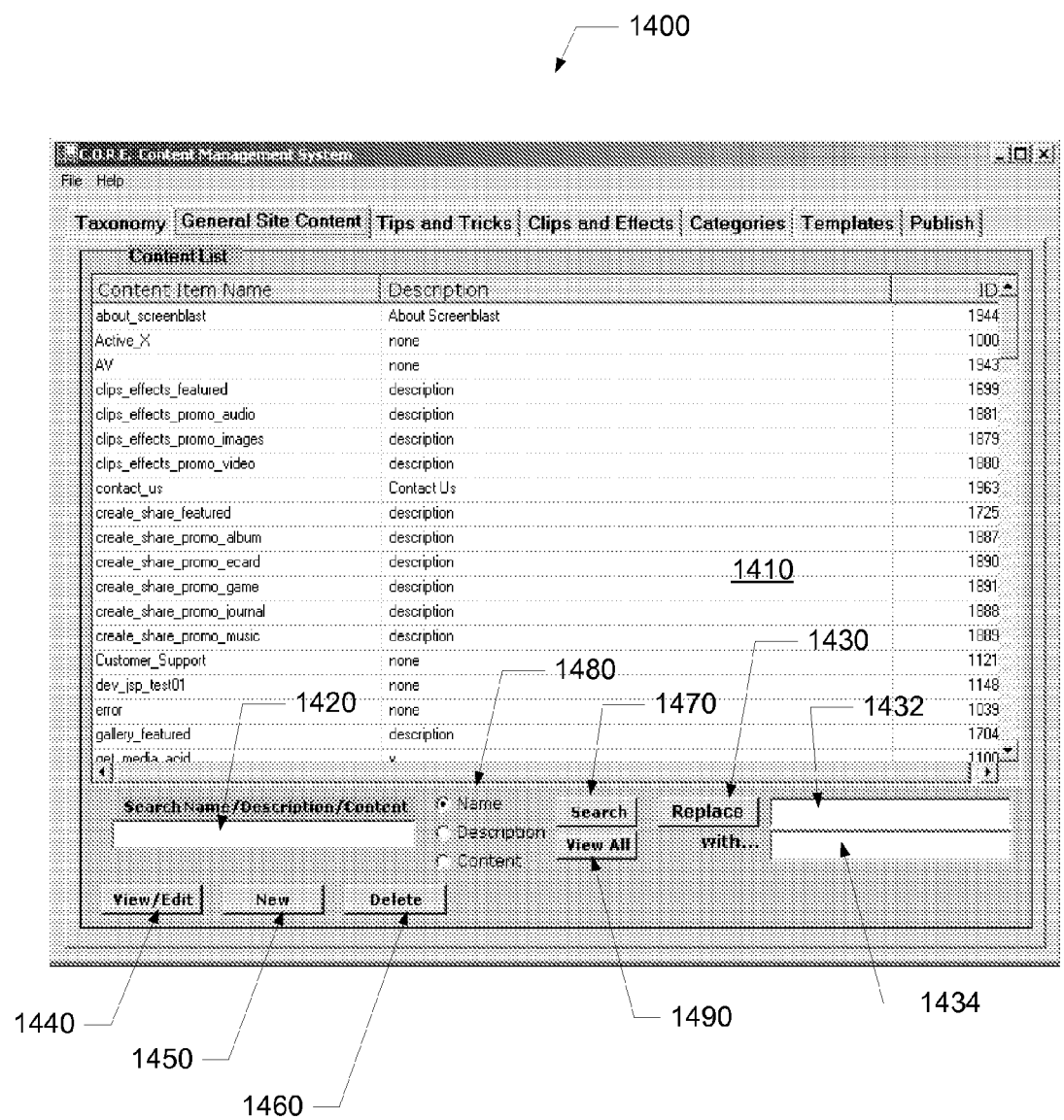
FIG. 14 shows one implementation of a General Site Content tab window of the CORE CMS tool.

FIG. 14 shows one implementation of a General Site Content tab window 1400 of the CORE CMS tool. The General Site Content is created by the producer, and defines dynamic markup-language based elements of the CORE system. These elements, when selected for viewing by the end-user, appear within a non-dynamic framework that has been defined using the CORE user interface (UI) Manager. The General Site Content is stored in the database as renderer specific markup language code (HTML, cHTML, WML, etc.) and associated data, such as name, description, etc.

The markup language based code (the actual content) in a Content Item is served to the end user, and has formatted copy as well as embedded links to other URLs and physical file assets, just as any other markup language content. The term "content item" used herein is synonymous with the term "media item" used herein and elsewhere. The term "asset" used herein refers to files, media items, and/or content items stored in a repository.

In the illustrated implementation, the General Site Content List interface 1400 shows all of the General Site Content items in a particular database, with links to editing interfaces, as well as giving the ability to add selected Content Items to a publishing list. The "Search/Edit" area of the interface also allows the user to filter the list display based on search criteria, and to view, edit, or create Content Items within the database.

In the illustrated implementation, the General Site Content tab window 1400 also includes a list box 1410, a search name/description/content box 1420, a replace button 1430, a view/edit button 1440, a new button 1450, a delete button 1460, a search button 1470, a search/description/content radio button 1480, and a view all button 1490.

The list box 1410 displays all of the General Site Content items in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category by clicking on that category. Clicking again in a particular category causes the items to be sorted in reverse order.

Given a particular search string in the text box 1420, and given the search area defined by the selection of either the Name, Description, or Content radio button 1480, pressing the Search Button 1470 causes the List Box 1410 to display only the items that match the search criteria. For instance, entering "comedy" in the search string, selecting the Name radio button 1480, and pressing Search 1470 will cause only those items with the string "comedy" somewhere in the name to be displayed. Pressing the "View All" button 1490 will negate the search feature and cause all items to be displayed again until the next search is performed.

The replace button 1430 and associated fields 1432, 1434 allow the producer to replace a string within the content of one or more selected items with another string. As an example, there may be a change in copy that applies to the entire site, such as a copyright notice that must be updated. The producer would select ALL of the items in the list box, and then enter the ORIGINAL string in the first box, followed by the desired replacement string in the second box. Clicking the "Replace" button 1430 would then search and replace all instances of the source string with the replacement string. Note that this works only on selected items in the list box, and will only replace strings within the markup language data itself.

The View/Edit Button 1440 brings up the "View/Edit" interface (see FIG. 15) for the selected item in the list box 1410. If no items, or multiple items are selected, this button 1440 has no effect. Double-clicking an item in the list box 1410 has the same effect as clicking this button 1440.

The New Button 1450 brings up the "New" interface (see FIG. 16) for creating new Content Item in the database. This interface is almost identical to the "View/Edit" interface.

The Delete Button 1460 deletes all selected Content Items in the list box. Before deletion, a confirmation prompt will appear to protect the user against inadvertently deleting items by mistake.

Figure 15:
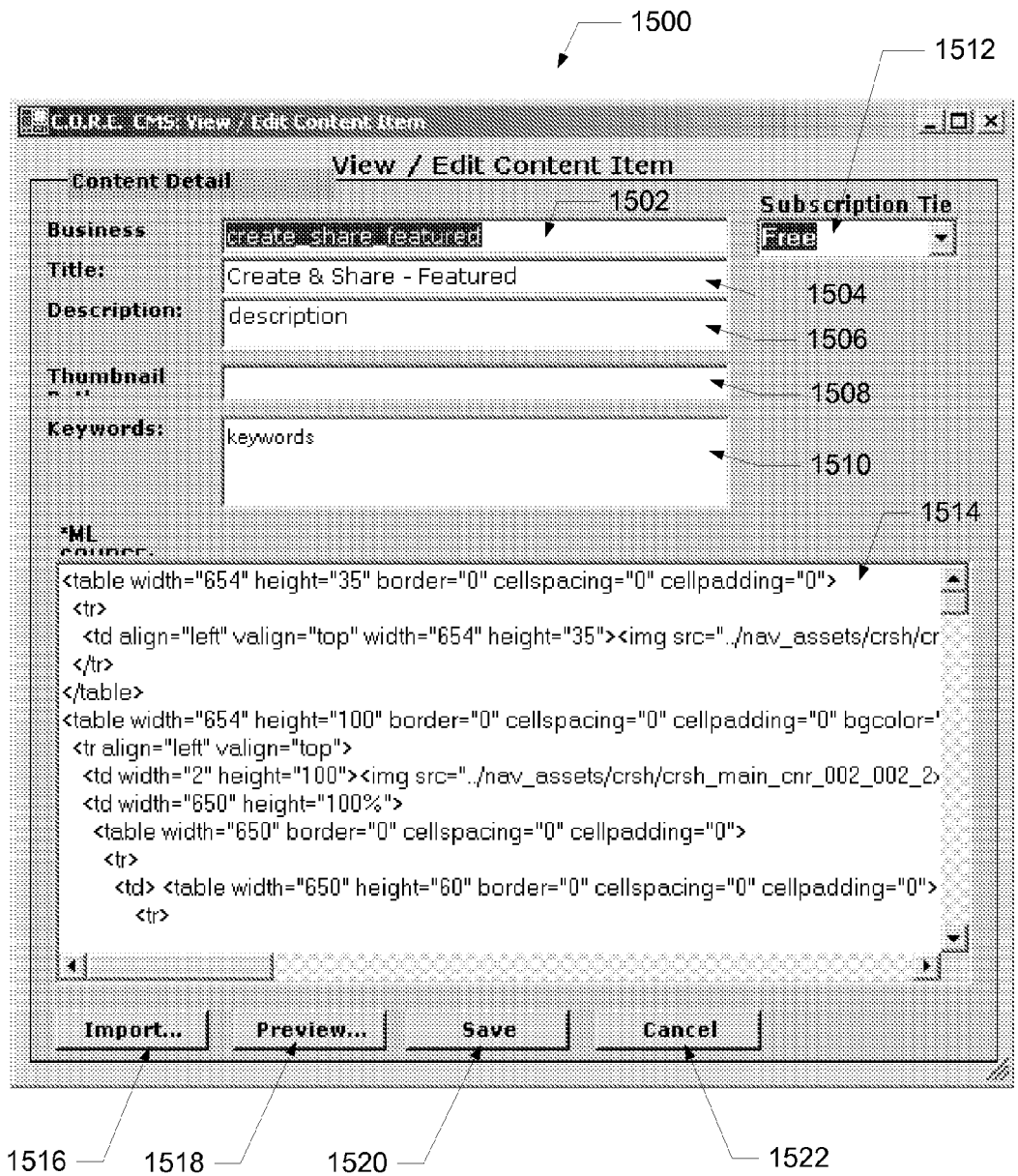
FIG. 15 shows one implementation of the view/edit interface for the General Site Content.

FIG. 15 shows one implementation of the view/edit interface 1500 for the General Site Content, which enables the detailed information in an individual Content Item to be viewed and edited. When saved, these Content Items are stored in the database as renderer specific markup language code (HTML, cHTML, WML, etc.) and associated data, such as name, description, etc.

In the illustrated implementation, the view/edit interface 1500 includes a business name field 1502, a title field 1504, a description field 1506, a thumbnail path 1508, a keywords box 1510, a subscription tier box 1512, an *ML source editing window 1514, an import button 1516, a preview button 1518, a save button 1520, and a cancel button 1522.

The business name field 1502 allows the user to change the business name of the Content Item. When this interface 1500 is accessed by using the "New" button 1450 from the main General Site Content List interface 1400, this field 1502 allows the user to enter the name of a new Content Item.

The title field 1504 allows the content creator to change the name of the Content Item that is displayed to an end user who is viewing the site. When this interface 1500 is accessed by using the "New" button 1450 from the main General Site Content List interface 1400, this field 1504 allows the content creator to enter the name of a new Content Item.

The description field 1506 allows the content creator to enter any extra descriptive information about the Content Item. This is displayed to the end user as additional information about the piece of site content.

The thumbnail path 1508 allows the content creator to specify a relative path (including a filename) that serves as a small thumbnail to be displayed in association with the Content Item.

The list of words, separated by spaces, in the keyword box 1510 is used by the site engine to search for content based on search criteria specified by the end user while viewing the site.

The subscription tier box 1512 allows the content creator to specify whether the Content Item is free, or is only viewable to subscribers.

The *ML source editing window 1514 serves as an editor for the Content Item's markup language code, such as HTML.

The import button 1516 launches a Windows file browser (see FIG. 16) that allows the site creator to select a text file for direct import into the editing interface.

The preview button 1518 launches an instance of Internet Explorer showing a view of the content that are being edited. Temporary HTML data is created that correctly maps links to graphics, etc. for pre-visualization.

The save button 1520 causes the tool to save the General Site Content Item to the database. If a new Content Item is being created, the saving over an existing Content Item is not allowed. If an existing Content Item is being edited, and the Content Item name has been changed, the tool launches a confirmation pop-up if attempting to save over an existing named Content Item. Otherwise, the save is performed automatically, the View/Edit interface 1500 is closed, and a "Content Item Successfully Saved" message appears in the header of the main interface.

The cancel button 1522 closes the General Site Content View/Edit interface 1500 and returns the user to the main interface 1400. Changes that may have been made in the View/Edit interface 1500 are not saved.

Figure 16:
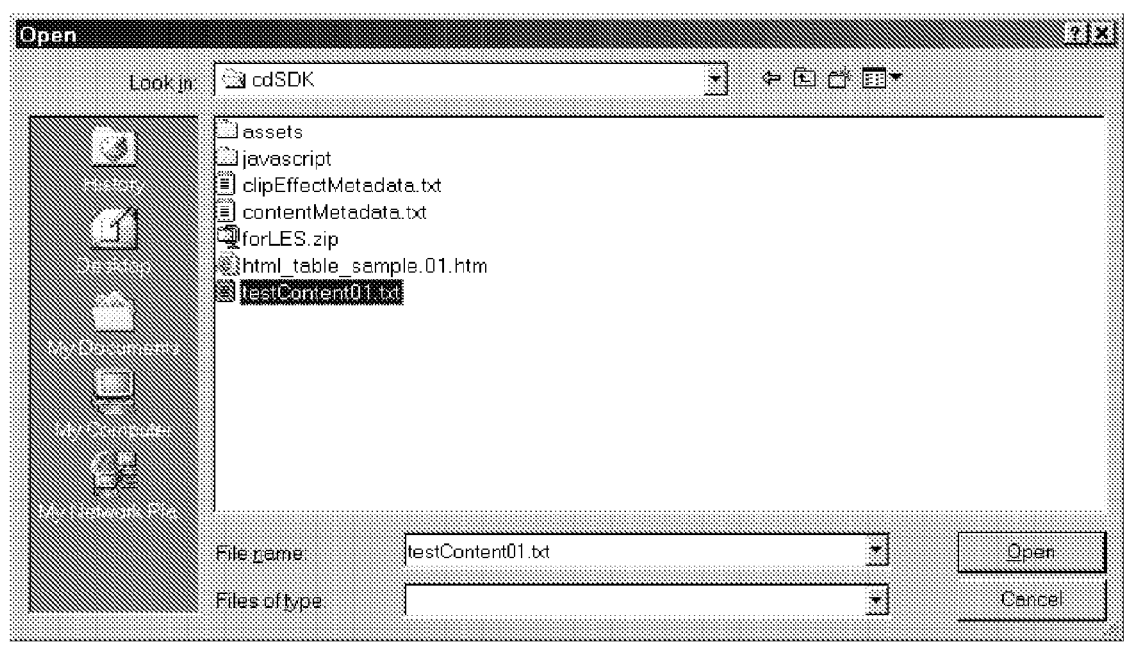
FIG. 16 shows one implementation of the General Site Content import browser interface.

FIG. 16 shows one implementation of the General Site Content import browser interface 1600. This browser, initiated from the import button 1516 in the Content Item Editing interface 1500, allows the producer to select a markup language text file for import. In the illustrated implementation, the content for import should contain a header of General Site Content specific data that is formatted in an XML based format. In other implementations, the header can be formatted in other markup language formats. The individual tags and data must be enclosed within <content_metadata> and </content_metadata> tags. This data is then followed by the actual markup-language based content, such as HTML code. An example Content Metadata header is shown below. In the example, language and renderer data is currently ignored. However, in other implementations, these data may be re-enabled depending on business needs.

```
<content_metadata>
    <business_name>pieceOfContent</business_name>
    <title>View Me, End User</title>
    <description>You really want to see this. Trust us.
    It's great!</description>
    <language>English</language>
    <renderer>HTML</renderer>
    <keywords>great wonderful rock guitar</keywords>
    <premium>true</premium>
```

-continued

```
    <thumbnail>http://screenblast/assets/thumbnails/
    testThumbnail.jpg</thumbnail>
</content_metadata>
```

Figure 17:
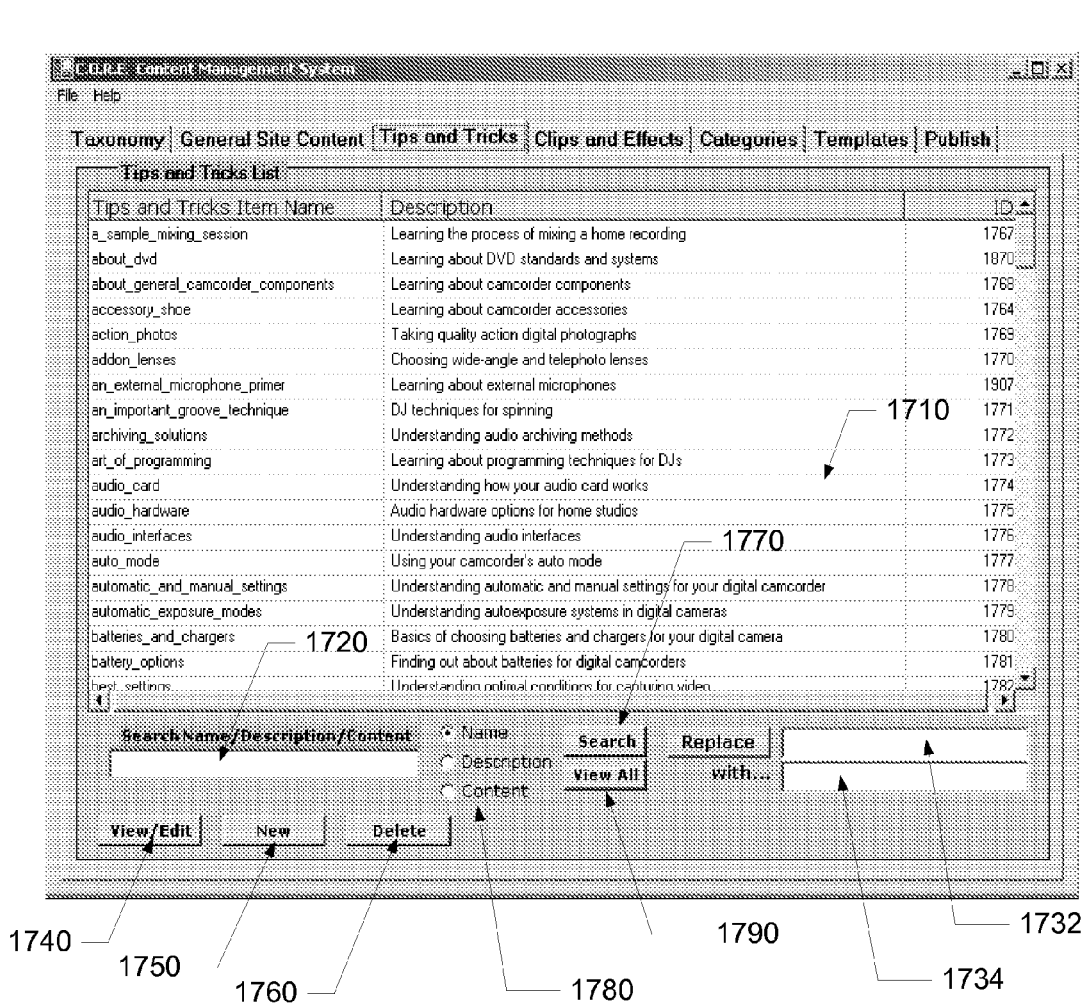
FIG. 17 shows one implementation of Tips and Tricks tab window of the CORE CMS tool.

FIG. 17 shows one implementation of Tips and Tricks tab window 1700 of the CORE CMS tool. Tips and Tricks are created by the producer, and, like General Site Content, define dynamic markup-language based elements of the CORE system. These elements, when selected for viewing by the end-user, appear within a non-dynamic framework that has been defined using the CORE UI Manager. Tips and Tricks are stored in the database as renderer specific markup language code (HTML, cHTML, WML, etc.) and associated data, such as name, description, etc. However, Tips and Tricks data is a superset of General Site Content data, and for each attribute, includes additional links for related software(s), links to taxonomy nodes, related templates, and related clips and effects.

The markup language-based code (the actual content) in a Tips and Tricks Item is served to the end user, and has formatted copy as well as embedded links to other URLs and physical file assets, just as any other markup language content.

The Tips and Tricks List interface 1700 shows all of the Tips and Tricks items in a particular database, with links to editing interfaces. The Tips and Tricks List interface 1700 also provides the ability to add selected Tips and Tricks Items to a publishing list. The "Search/Edit" area of the interface also allows the user to filter the list display based on search criteria, and to view, edit, or create Tips and Tricks Items within the database.

In the illustrated implementation, the Tips and Tricks tab window 1700 also includes a list box 1710, a search name/description/content box 1720, a replace button 1730, a view/edit button 1740, a new button 1750, a delete button 1760, a search button 1770, a search/description/content radio button 1780, and a view all button 1790.

The list box 1710 displays all of the Tips and Tricks items in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category by clicking on that category. Clicking again in a particular category causes the items to be sorted in reverse order.

Given a particular search string in the text box 1720, and given the search area defined by the selection of either the Name, Description, or Content radio button 1780, pressing the Search Button 1770 will cause the List Box 1710 to display only the items that match the search criteria. For instance, entering "comedy" in the search string, selecting the Name radio button 1780, and pressing Search 1770 will cause only those items with the string "comedy" somewhere in the name to be displayed. Pressing the "View All" button 1790 will negate the search feature and cause all items to be displayed again until the next search is performed.

The replace button 1730 and associated fields 1732, 1734 allow the producer to replace a string within the content of one or more selected items with another string. As an example, there may be a change in copy that applies to the entire site, such as a copyright notice that must be updated. The producer would select all of the items in the list box, and then enter the ORIGINAL string in the first box, followed by the desired replacement string in the second box. Clicking the "Replace" button 1730 would then search and replace all instances of the source string with the replacement string. Note that this works only on selected items in the list box, and will only replace strings within the markup language data itself.

This View/Edit button 1740 brings up the "View/Edit" interface (see FIG. 18) for the selected item in the list box 1710. If no items, or multiple items are selected, this button 1740 has no effect. Double-clicking an item in the list box 1710 has the same effect as clicking this button 1740.

The New button 1750 brings up the "New" interface for creating new Content Item in the database. This interface is almost identical to the "View/Edit" interface.

The Delete button 1760 deletes all selected Tips and Tricks Items in the list box. Before deletion, a confirmation prompt will appear to protect the user against inadvertently deleting items by mistake.

Figure 18:
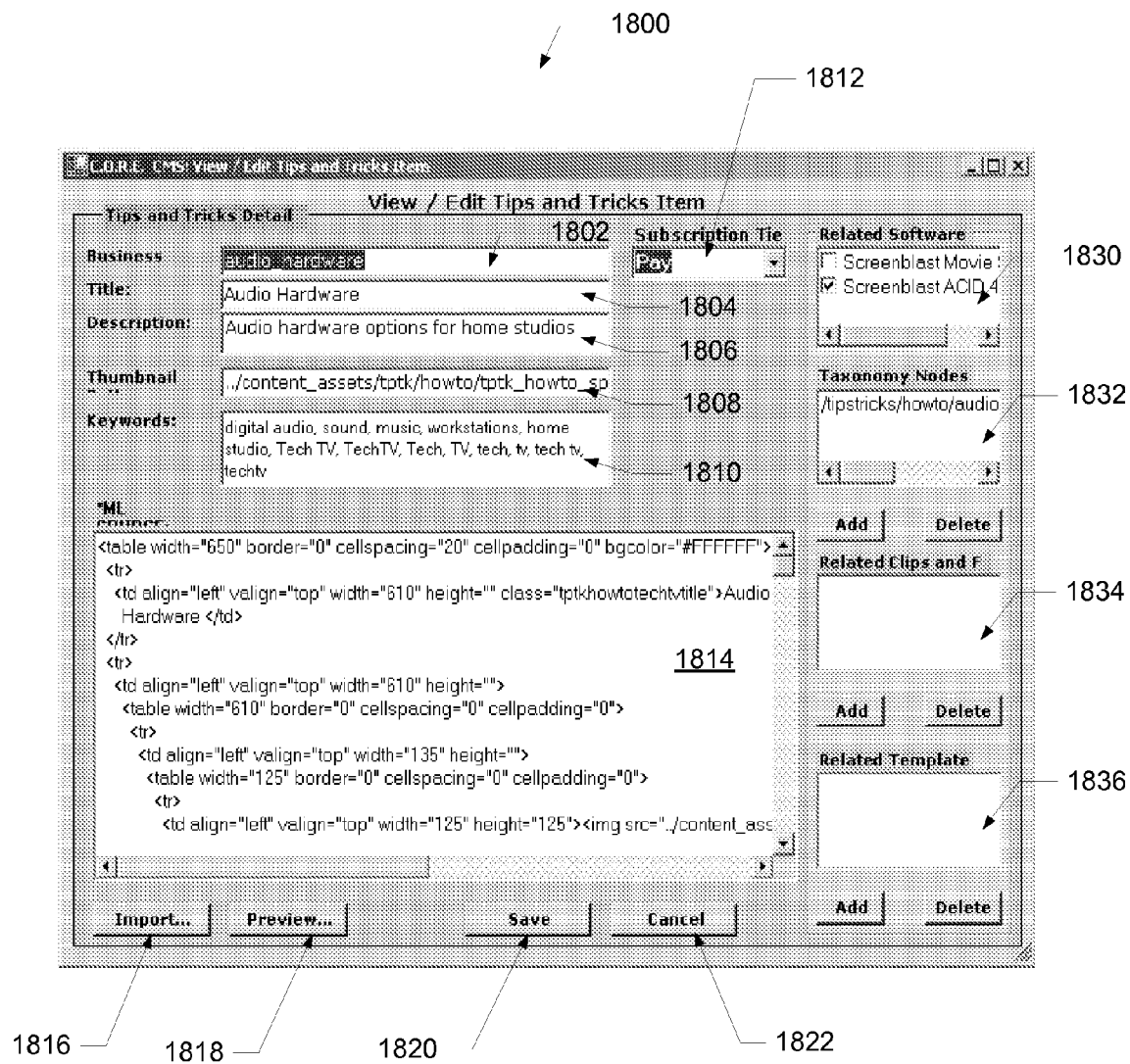
FIG. 18 shows one implementation of the view/edit interface for the Tips and Tricks.

FIG. 18 shows one implementation of the view/edit interface 1800 for the Tips and Tricks, which enables the detailed information in an individual Tips and Tricks Item to be viewed and edited. When saved, these Tips and Tricks Items are stored in the database as renderer specific markup language code (HTML, cHTML, WML, etc.) and associated data, such as name, description, etc.

In the illustrated implementation, the view/edit interface 1800 includes a business name field 1802, a title field 1804, a description field 1806, a thumbnail path 1808, a keywords box 1810, a subscription tier box 1812, an *ML source editing window 1814, an import button 1816, a preview button 1818, a save button 1820, and a cancel button 1822. The view/edit interface 1800 further includes a related software box 1830, a taxonomy nodes box 1832, a related clips and effects box 1834, and a related templates box 1836.

The business name field 1802 allows the user to change the business name of the Tips and Tricks Item. When this interface 1800 is accessed by using the "New" button 1750 from the main Tips and Tricks List interface 1700, this field 1802 allows the user to enter the name of a new Tips and Tricks Item.

The title field 1804 allows the content creator to change the name of the Tips and Tricks Item that is displayed to an end user who is viewing the site. When this interface 1800 is accessed by using the "New" button 1750 from the main Tips and Tricks List interface 1700, this field 1804 allows the content creator to enter the name of a new Tips and Tricks Item.

The description field 1806 allows the content creator to enter any extra descriptive information about the Tips and Tricks Item. This is displayed to the end user as additional information about the piece of site content.

The thumbnail path 1808 allows the content creator to specify a relative path (including filename) that serves as a small thumbnail to be displayed in association with the Tips and Tricks Item.

This list of words, separated by spaces, in the keyword box 1810 is used by the site engine to search for Tips and Tricks items based on search criteria specified by the end user while viewing the site.

The subscription tier box 1812 allows the content creator to specify whether the Tips and Tricks Item is free, or is only viewable to subscribers.

The *ML source editing window 1814 serves as an editor for the Tips and Tricks Item's markup language code, such as HTML.

The import button 1816 launches a Windows file browser (see FIG. 21) that allows the site creator to select a text file for direct import into the editing interface.

The preview button 1818 launches an instance of Internet Explorer showing a view of the Tips and Tricks items that are being edited. Temporary HTML data is created that correctly maps links to graphics, etc. for pre-visualization.

The save button 1820 causes the tool to save the Tips and Tricks Item to the database. If creating a new Tips and Tricks Item, the saving over an existing Tips and Tricks Item is not allowed. If editing an existing Tips and Tricks Item, and the Tips and Tricks Item name has been changed, the tool launches a confirmation pop-up if attempting to save over an existing named Tips and Tricks Item. Otherwise, the save is performed automatically, the View/Edit interface 1800 is closed, and a "Tips and Tricks Item Successfully Saved" message appears in the header of the main interface.

The cancel button 1822 closes the Tips and Tricks View/Edit interface 1800 and returns the user to the main interface 1700. Changes that may have been made in the View/Edit interface 1800 are not saved.

The related software checkable list box 1830 shows all of the possible related software items that exist in the database.

The taxonomy nodes box 1832 shows the path(s) of any taxonomy nodes to which this Tips and Tricks item is attached. The "Add" button launches a Taxonomy Browser (see FIG. 19), and the "Delete" button removes selected items from the list, after a positive response to a delete confirmation dialog.

The Related Clips and Effects list box 1834 shows the name(s) of any Clips and Effect that are related to this Tips and Tricks item. The "Add" button launches a Clips and Effects Browser (see FIG. 20), and the "Delete" button removes selected items from the list, after a positive response to a delete confirmation dialog.

The Related Templates list box 1836 shows the name(s) of any Templates that are related to this Tips and Tricks item. The "Add" button launches a Template Browser (see FIG. 22), and the "Delete" button removes selected items from the list, after a positive response to a delete confirmation dialog.

Figure 19:
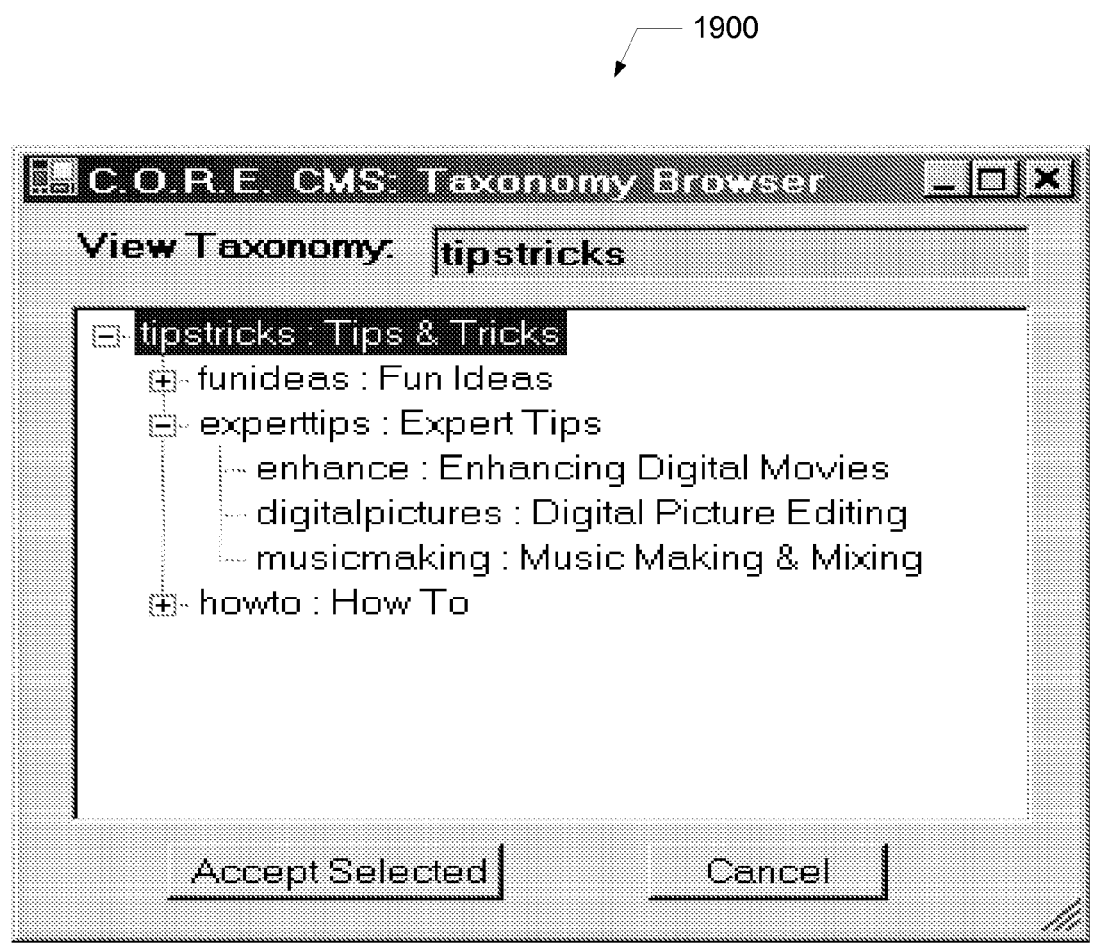
FIG. 19 shows one implementation of the Tips and Tricks Taxonomy browser interface.

FIG. 19 shows one implementation of the Tips and Tricks Taxonomy browser interface 1900, which allows the site creator to view and select taxonomy nodes from the "Tips and Tricks" root taxonomy. By pressing the "Accept Selected" button 1902, the selected taxonomy node is added to the list of associated taxonomy nodes for the Tips and Tricks Item that is currently being edited.

Figure 20:
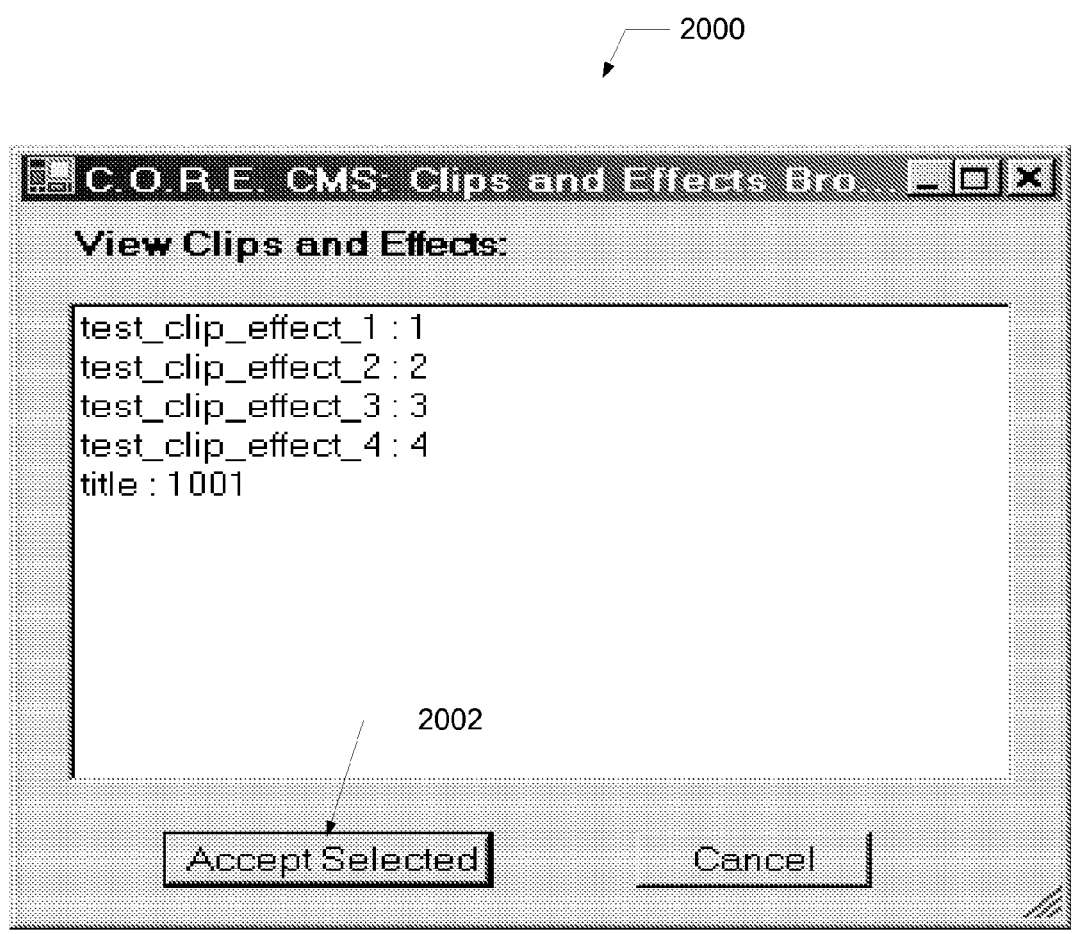
FIG. 20 shows one implementation of the Tips and Tricks clips and effects browser interface.

FIG. 20 shows one implementation of the Tips and Tricks clips and effects browser interface 2000, which allows the site creator to view and select Clips and Effects items from the repository. By pressing the "Accept Selected" button 2002, the selected Clips and Effect item is added to the list of associated Clips and Effects for the Tips and Tricks Item that is currently being edited.

Figure 21:
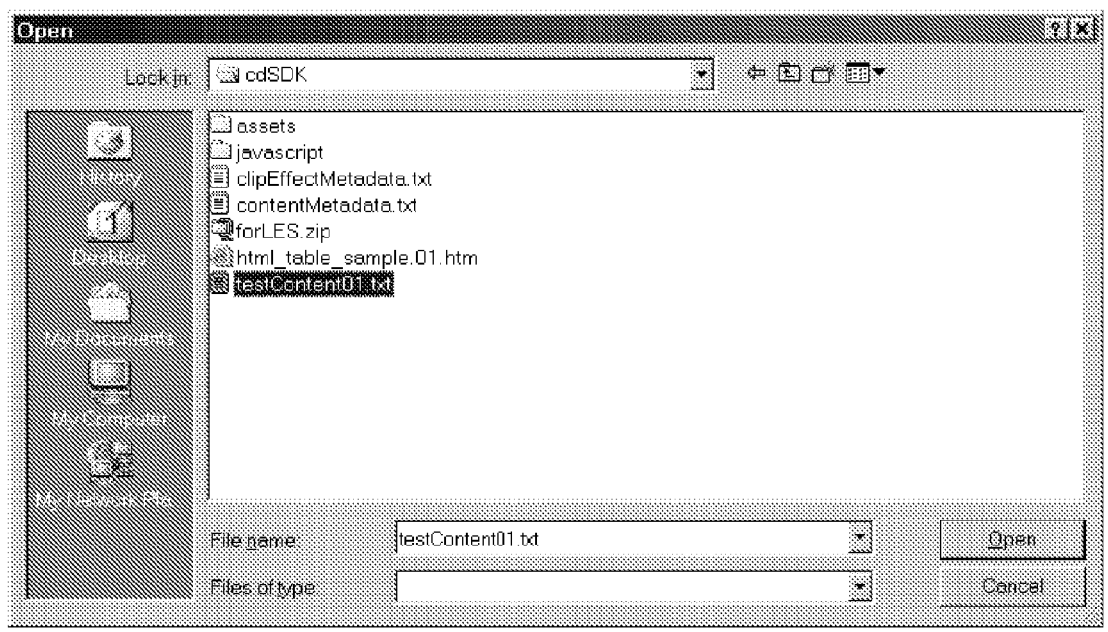
FIG. 21 shows one implementation of the Tips and Tricks import browser interface.

FIG. 21 shows one implementation of the Tips and Tricks import browser interface 2100. This browser, initiated from the import button 1816 in the Tips and Tricks Editing interface 1800, allows the producer to select a markup language text file for import. In the illustrated implementation, the content for import should contain a header of Tips and Tricks specific data that is formatted in an XML based format. The individual tags and data must be enclosed within <content_metadata> and </content_metadata> tags. This data is then followed by the actual markup-language based content, such as HTML code. An example Content Metadata header is shown below. In the example, the Tips and Tricks metadata format is identical to the General Site Content metadata format, with the addition of the <related_software>, <related_template>, <related_clip_effect>, and <taxonomy> tags. Further, implementations, these keywords may be re-enabled depending on business needs.

```
<content_metadata>
    <business_name>tipAndTrick</business_name>
    <title>View Me, End User!</title>
    <description>You really want to see this. Trust us.
    It's great!</description>
    <language>English</language>
    <renderer>HTML</renderer>
    <keywords>great wonderful rock guitar howto play</keywords>
    <premium>true</premium>
    <thumbnail>http://screenblast/assets/thumbnails/
    testThumbnail.jpg</thumbnail>
    <!--THE TAGS BELOW ARE ONLY USED FOR TIPS AND
    TRICKS -->
    <related_software>software name A</related_software>
    <related_software>software name B</related_software>
    <!--ANY NUMBER OF RELATED TEMPLATES -->
    <related_template>Member pub template name A</
    related_template>
    <related_template>Member pub template name B</
    related_template>
    <!--ANY NUMBER OF RELATED CLIPS AND EFFECTS -->
    <related_clip_effect>clip Name A</related_clip_effect>
    <related_clip_effect>effect Name B</related_clip_effect>
    <!--ANY NUMBER OF TAXONOMY LINKS -->
    <taxonomy>root/whatever/whatever2/leaf</taxonomy>
    <taxonomy>root/whatever/whatever3/leaf2</taxonomy>
</content_metadata>
```

Figure 22:
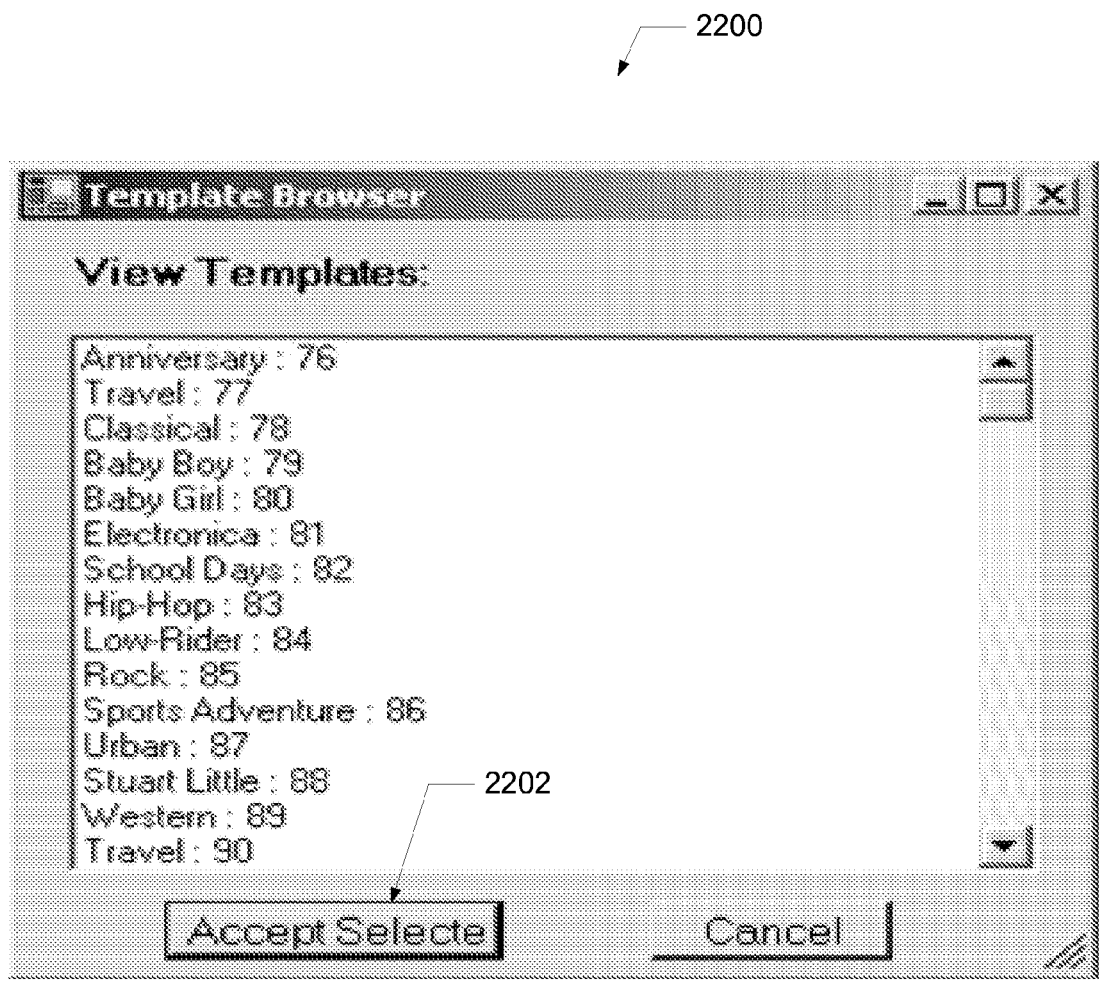
FIG. 22 shows one implementation of the Tips and Tricks template browser interface.

FIG. 22 shows one implementation of the Tips and Tricks template browser interface 2200. This browser allows the site creator to view and select Template items from the database. By pressing the "Accept Selected" button 2202, the selected Template item is added to the list of associated Templates for the Tips and Tricks Item that is currently being edited.

Figure 23:
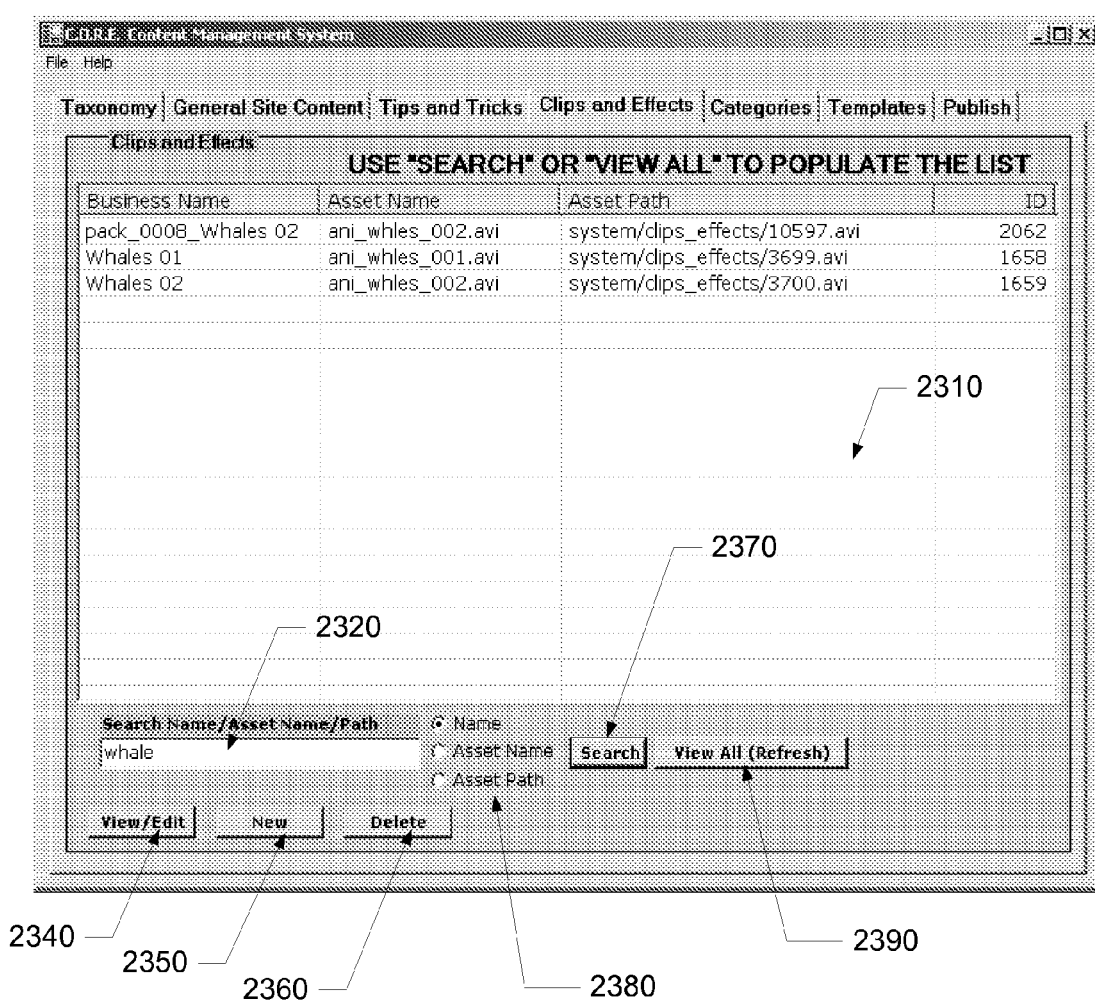
FIG. 23 shows one implementation of Clips and Effects tab window of the CORE CMS tool.

FIG. 23 shows one implementation of Clips and Effects tab window 2300 of the CORE CMS tool. Clips and Effects are created by the producer, and are made available to the end-user of the site through links created by the producer from other CMS objects, such as "Tips and Tricks" items. Clips and Effects reference repository items (assets), but provide a way for the producer to specify more data that can be used for display of those assets on the site.

The Clips and Effects List interface 2300 shows all of the Clips and Effects items in a particular database, with links to editing interfaces. The Clips and Effects List interface 2300 also provides the ability to add selected Clips and Effects to a publishing list. The "Search/Edit" area of the interface also allows the user to filter the list display based on search criteria, and to view, edit, or create Clips and Effects Items within the database.

In the illustrated implementation, the Clips and Effects tab window 2300 also includes a list box 2310, a search name/description/content box 2320, a view/edit button 2340, a new button 2350, a delete button 2360, a search button 2370, an asset path radio button 2380, and a view all button 2390.

The list box 2310 displays all of the Clips and Effects Items in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category by clicking on that category. Clicking again in a particular category causes the items to be sorted in reverse order.

Given a particular search string in the text box 2320, and given the search area defined by the selection of either the Title, Asset Name, or Asset Path radio button, pressing the Search Button 2370 will cause the List Box 2310 to display only the items that match the search criteria. For instance, entering "comedy" in the search string, selecting the Name radio button 2380, and pressing Search 2370 will cause only those items with the string "comedy" somewhere in the name to be displayed. Pressing the "View All" button 2390 will negate the search feature and cause all items to be displayed again until the next search is performed.

The View/Edit button 2340 brings up the "View/Edit" interface (see FIG. 24) for the selected item in the list box 2310. If no items, or multiple items are selected, this button 2340 has no effect. Double-clicking an item in the list box 2310 has the same effect as clicking this button 2340.

The New button 2350 brings up the "New" interface for creating a new Clips and Effects Item in the database. This interface is almost identical to the "View/Edit" interface.

The Delete button 2360 deletes all selected Clips and Effects Items in the list box. Before deletion, a confirmation prompt will appear to protect the user against inadvertently deleting items by mistake.

Figure 24:
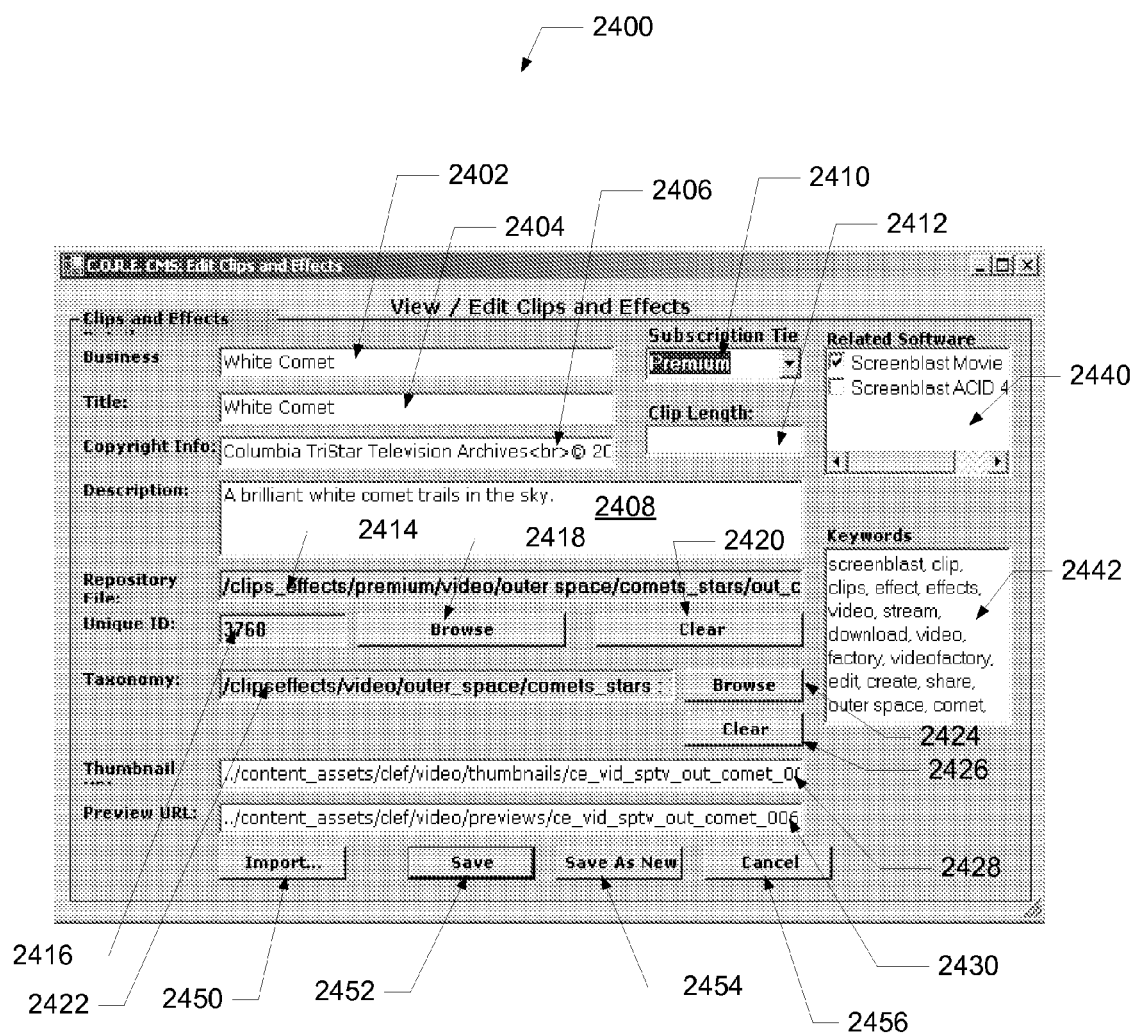
FIG. 24 shows one implementation of the View/Edit interface for the Clips and Effects.

FIG. 24 shows one implementation of the View/Edit interface 2400 for the Clips and Effects, which enables the detailed information in an individual Clips and Effects Item to be viewed and edited. When saved, these Clips and Effects Items are stored in the database as metadata that is intended to be used by the back-end site display technology in presenting the repository item to the end-user.

In the illustrated implementation, the View/Edit interface 2400 includes a business name field 2402, a title field 2404, a copyright information field 2406, a description field 2408, a subscription tier box 2410, a clip length field 2412, a repository file field 2414, a unique ID field 2416, browse 2418 and clear 2420 buttons related to the repository file, a taxonomy field 2422, browse 2424 and clear 2426 buttons related to the taxonomy, a thumbnail URL field 2428, a preview URL field 2430, an import button 2450, a save button 2452, a save as new button 2454, and a cancel button 2456. The View/Edit interface 2400 further includes a related software box 2440, and a keywords box 2442.

The business name field 2402 allows the user to change the business name of the Clips and Effects Item. When this interface 2400 is accessed by using the "New" button 2350 from the main Clips and Effects List interface 2300, the business name field 23402 allows the user to enter the name of a new Clips and Effects Item.

The title field 2404 allows the content creator to change the name of the Clips and Effects Item that is displayed to an end user who is viewing the site. When this interface 2400 is accessed by using the "New" button 2350 from the main Clips and Effects List interface 2300, this field 2404 allows the content creator to enter the name of a new Clips and Effects Item.

The description field 2408 allows the content creator to enter any extra descriptive information about the Clips and Effects Item. This is displayed to the end user as additional information about the piece of site content.

The subscription tier box 2410 allows the content creator to specify whether the Clips and Effects Item is free, or is only viewable to subscribers.

The repository file field 2414 shows the full path of the selected repository asset associated with this Clips and Effects Item. The unique ID field 2416 shows the unique database identifier for the selected repository asset. The browse button 2418 launches a repository browser (see FIG. 25) that contains all repository items in the "clips_effects" root path.

The taxonomy field 2422 shows the full path of the selected taxonomy associated with this Clips and Effects item. The browse button 2424 launches a browser that includes all taxonomy items in the root path.

The thumbnail URL field 2428 allows the content creator to specify a relative path (including filename) that serves as a small thumbnail to be displayed in association with the Clips and Effects Item.

The preview URL field 2430 allows the content creator to specify a relative path (including filename) that serves as a clickable preview of the Clips and Effects Item.

The import button 2450 launches a Windows file browser (see FIG. 26) that allows the site creator to select a text file for direct import into the editing interface.

The save button 2452 causes the tool to save the Clips and Effects Item to the database. The save as new button 2454 saves the Clips and Effects Item as a new item. If creating a new Clips and Effects Item, saving over an existing Clips and Effects Item is not allowed. If editing an existing Clips and Effects Item, and the Clips and Effects Item name has been changed, the tool launches a confirmation pop-up if attempting to save over an existing named Clips and Effects Item. Otherwise, the save is performed automatically, the View/Edit interface 2400 is closed, and a "Clips and Effects Item Successfully Saved" message appears in the header of the main interface.

The cancel button 2456 closes the Clips and Effects View/Edit interface 2400 and returns the user to the main interface 2300. Changes that may have been made in the View/Edit interface 2400 are not saved.

The related software checkable list box 2440 shows all of the possible related software items that exist in the database. The items in this list are selectable through a check box for the edited Clips and Effects Item.

The keyword box 2442 includes a list of words used by the site engine to search for Clips and Effects based on search criteria specified by the end user while viewing the site.

Figure 25:
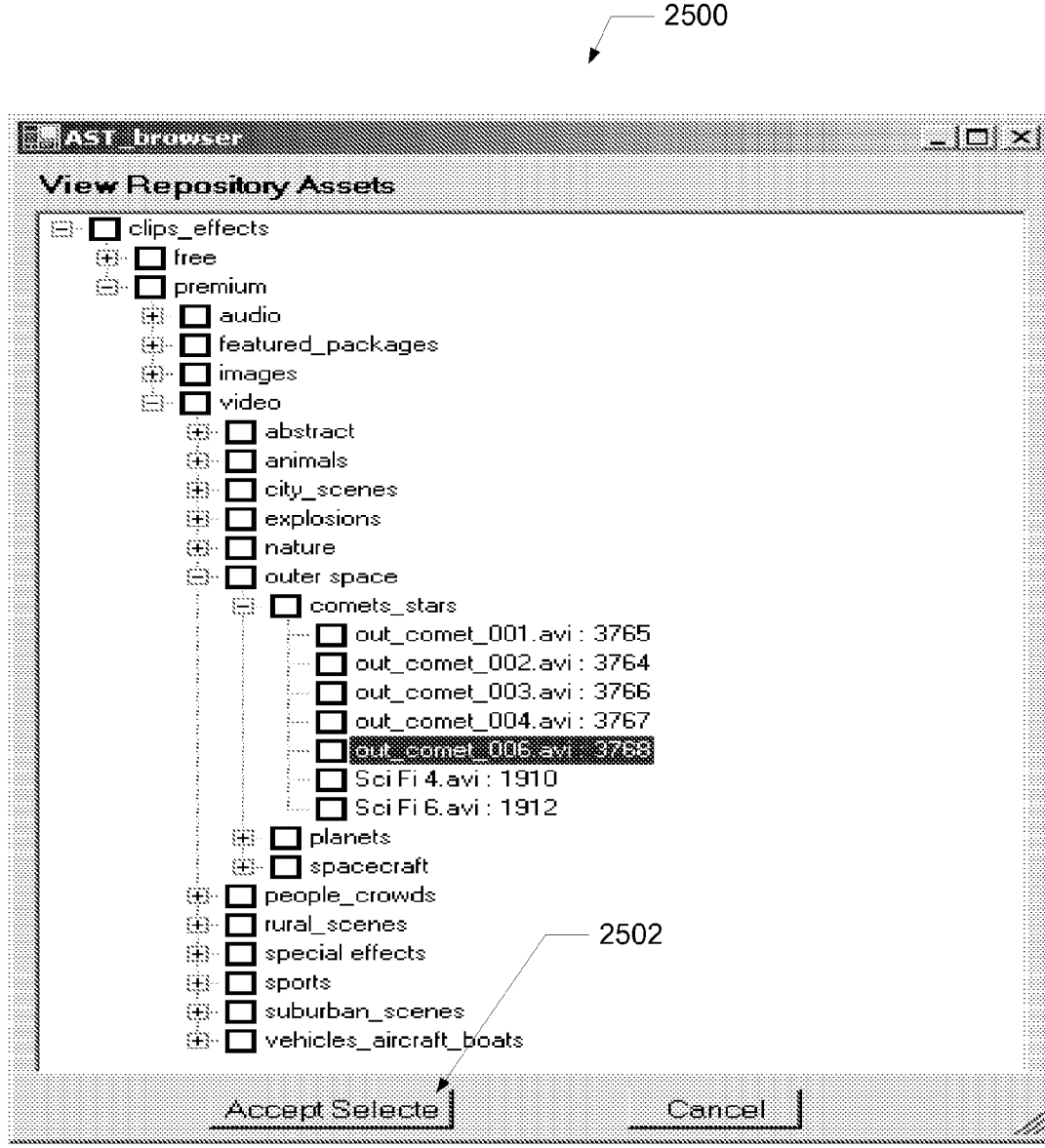
FIG. 25 shows one implementation of the Clips and Effects Asset browser interface.

FIG. 25 shows one implementation of the Clips and Effects Asset browser interface 2500, which allows the site creator to view and select assets from the "clips_effects" root of the repository. By pressing the "Accept Selected" button 2502, the selected asset is added to the list of associated assets for the Clips and Effects Item that is currently being edited.

Figure 26:
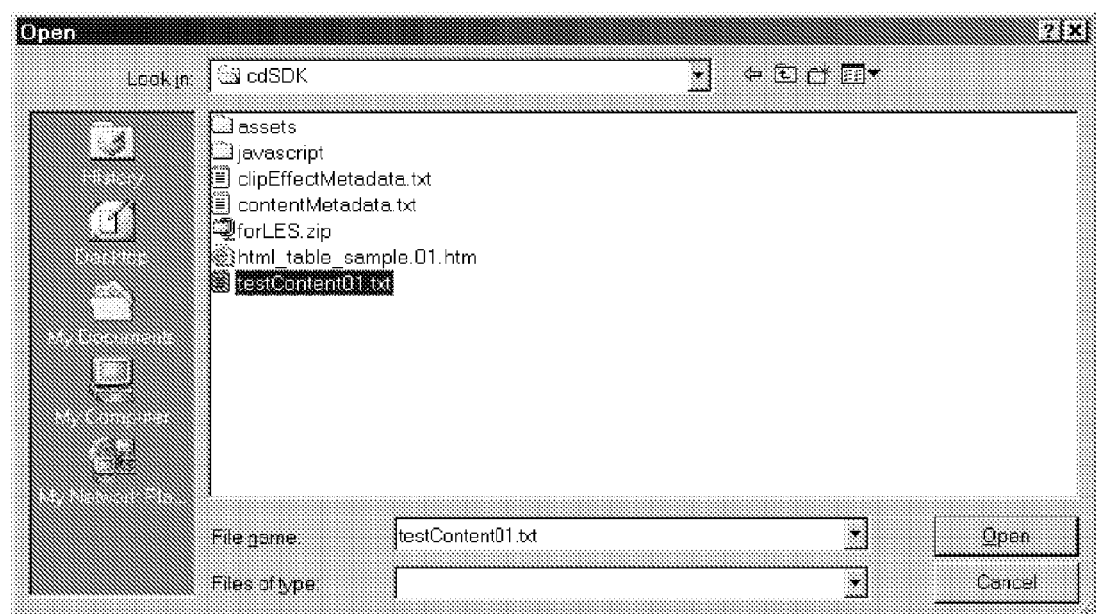
FIG. 26 shows one implementation of the Clips and Effects import browser interface.

FIG. 26 shows one implementation of the Clips and Effects import browser interface 2600. This browser, initiated from the import button 2450 in the Clips and Effects Editing interface 2400, allows the producer to select a text file for import. The text file should contain a header of Clips and Effects specific data that is formatted in an XML based format. The individual tags and data must be enclosed within <clip_effect_metadata> and closing </clip_effect_metadata> tags. This data is not followed by any other markup-language based content, such as HTML code. An example Clips and Effects Metadata header is shown below. In the example, it should be noted that the Clips and Effects metadata format is not the same as either General Site Content metadata or Tips and Tricks metadata.

```
<clip_effect_metadata>
    <business_name>clipAndEffect</business_name>
    <title>I'm a GREAT clip!</title>
    <description>Use me in your movie to show how cool you are!
    </description>
    <keywords> great wonderful rock guitar howto play </keywords>
    <premium>false</premium>
    <thumbnail>http://whatever/clipThumbnail.jpg</thumbnail>
    <preview>http://whatever/clipPreview.wmf</preview>
    <!-- GREAT CLIP -->
    <taxonomy>root/whatever/whatever2/leaf</taxonomy>
    <related_software>software name A</related_software>
    <related_software>software name B</related_software>
</clip_effect_metadata>
```

Figure 27:
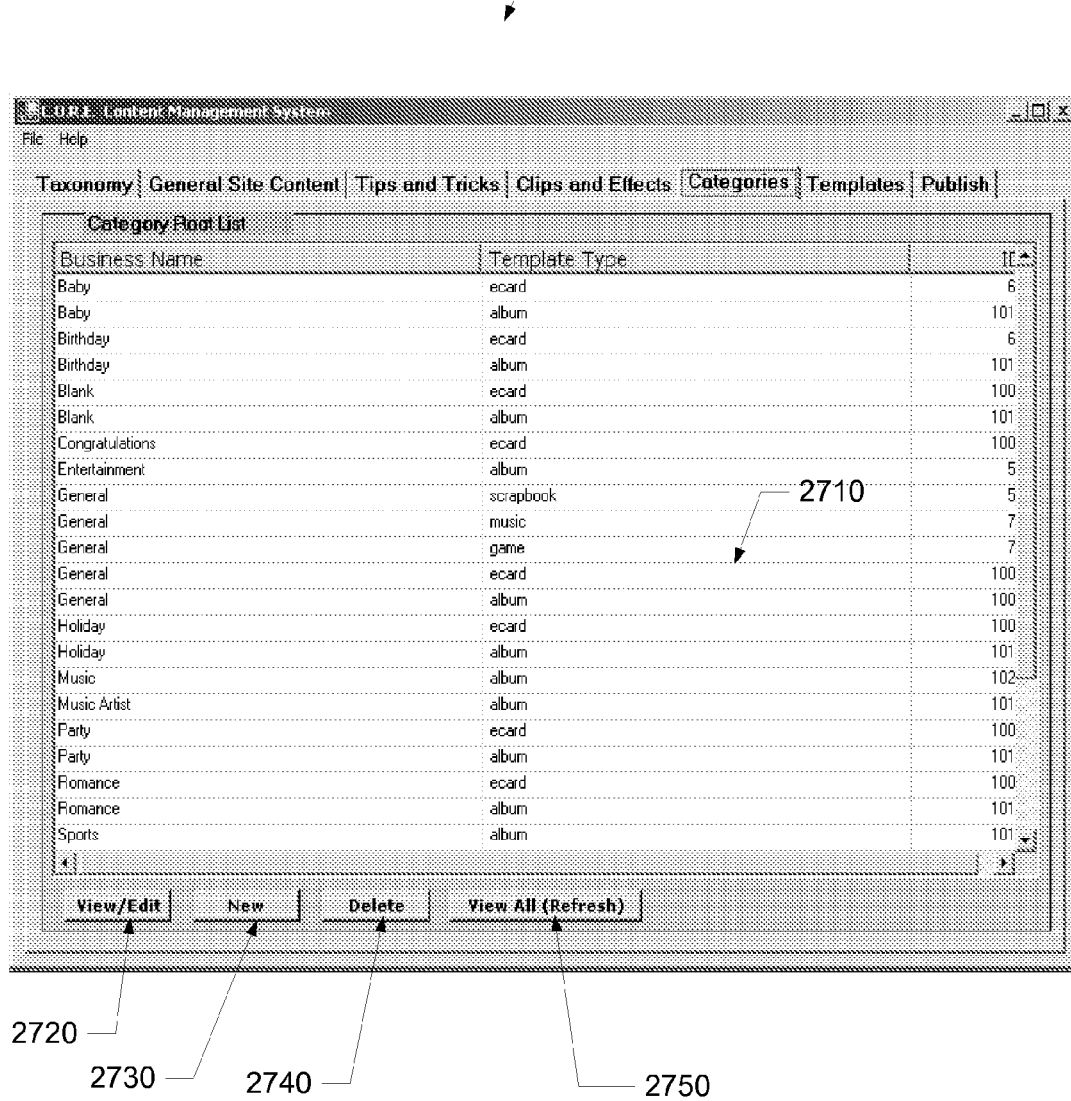
FIG. 27 shows one implementation of a Categories tab window of the CORE CMS tool.

FIG. 27 shows one implementation of a Categories tab window 2700 of the CORE CMS tool. Categories are created by the site/content developer, and are very similar in nature to taxonomies. However, in practice, they are usually not as "nested" in a tree structure as taxonomies. Instead of defining the overall dynamic site content structure, Categories are used to organize Templates. One or more categories may be assigned to a template, although internally, that template will then "belong" to those categories in child relationships. Like Taxonomies, Categories are stored in the database as a flat table of individual nodes that have parent links (through paths) and associated data, such as business name, display name, etc.

The nodes in a particular Category can reference other nodes. However, if no parent node is referenced via the "path", the node is considered a "root" node. The Categories reference Templates. Furthermore, for the site end-users, the Categories allow the browsing of the Templates in a meaningful way. Thus, the CMS user does not need to worry about "paths", as these are constructed for the user based on the items generated or edited in the Category editor described below.

In the illustrated implementation, the Categories tab window 2700 includes a list box 2710, a view/edit button 2720, a new button 2730, a delete button 2740, and a view all button 2750.

The list box 2710 displays all of the Category nodes in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category (Business Name, Template Type, or ID) by clicking on that category. Clicking again on one of these header categories causes the items to be sorted in reverse order.

The view/edit button 2720 brings up the "View/Edit" interface (see FIG. 28) for the selected item in the list box 2710. If no items, or multiple items are selected, this button 2720 has no effect. Double-clicking an item in the list box 2710 has the same effect as clicking this button 2720.

The new button 2730 brings up the "New" interface for creating new Categories in the database. This interface is almost identical to the "View/Edit" interface 2800, with the exception of the header, which reads, "Create New Category Item".

The delete button 2740 deletes all selected Categories in the list box. Before deletion, a confirmation prompt will appear to protect the user against inadvertently deleting items by mistake. If Template items reference the selected Category, a "Cancel/Confirm" prompt will appear, and if "Confirm" is selected, the other Template item(s)'s reference(s) to that deleted Category will be removed. This confirmation is almost identical to the "Taxonomy" delete confirmation, and appears when "Delete" is selected from the right-click pop-up menu. Since Category node deletion removes all children as well.

Sometimes changes are made from more than one instance of the CMS. This means that it is possible, under rare conditions, that the list box 2710 does not correctly represent the current state of the database. The view all button 2750 forces a complete refresh of the taxonomy root-node list, based on the current state of the database.

Figure 28:
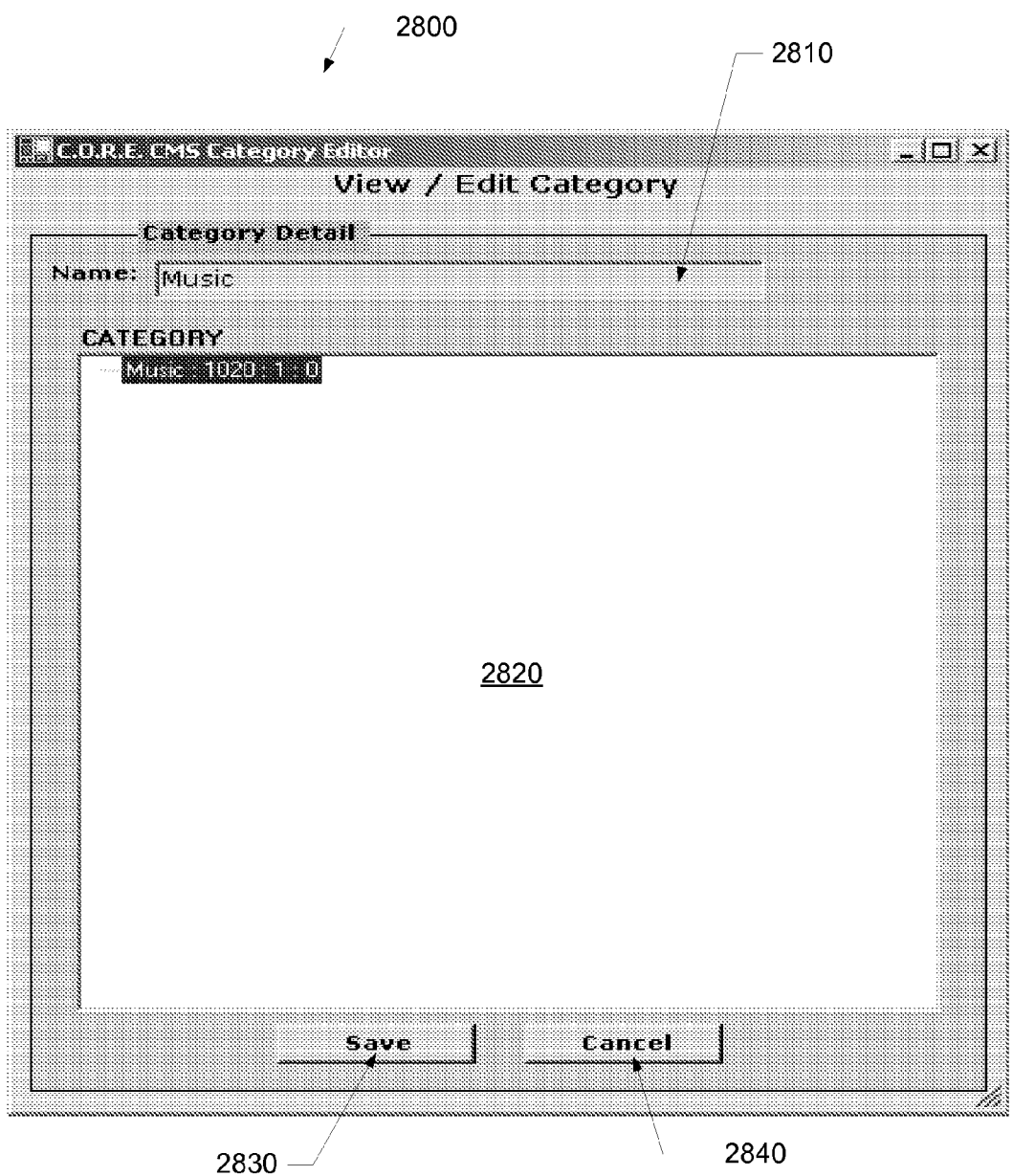
FIG. 28 shows one implementation of the "View/Edit" interface for the selected item in the list box.

FIG. 28 shows one implementation of the "View/Edit" interface 2800 for the selected item in the list box 2710. This interface 2800 allows the detailed information in an individual Category tree to be viewed and edited. When saved, these Categories are stored in the database as a collection of individual Category Nodes with the associated data, such as business name, parent path, template type, etc. The "View/Edit" interface 2800 includes a name field 2810, a Category edit window 2820, a save button 2830, and a cancel button 2840.

The name field 2810 is not directly editable. The field 2810 shows the business name of the "root" node of the category tree. If the name of the root node is changed through the Category Node Edit interface (see below), this field is automatically updated to reflect that change.

The Category editing Window 2820 serves as an editor for the Category. If a new Category is being created, this window 2820 is initially left blank, except for the root node, whose name corresponds with the "Name" field. Like almost any tree browser, nodes with children may be expanded or contracted by clicking on the associated "+" and "−" symbols next to the named nodes. An individual node may be selected, and actions on a node may be performed by right-clicking with the mouse and selecting the action from the pop-up menu. The actions include 'new', 'edit', 'cut', 'copy', 'paste', and 'delete'.

The 'new' action creates a new child node under the selected (parent) node. The 'edit' action edits the selected node's business name and/or display name. The 'cut' action removes and stores the selected node for pasting elsewhere. The 'copy' action stores the selected node for pasting elsewhere without removing the node. The 'paste' action adds the most recently cut or copied node as a child. The 'delete' action removes the selected node.

The save button 2830 causes the CMS to perform a save to the database of the entire category's node data. If editing an existing category, and the category business name has been changed, the tool launches a confirmation pop-up if attempting to save over an existing named Category. Otherwise, the save is performed automatically, the View/Edit interface 2800 is closed, and a "Category Tree Successfully Saved" message appears in the header of the main interface.

The cancel button 2840 closes the Category View/Edit interface 2800 and returns the user to the main interface 2700. Changes that may have been made in the View/Edit interface 2800 are not saved.

Figure 29:
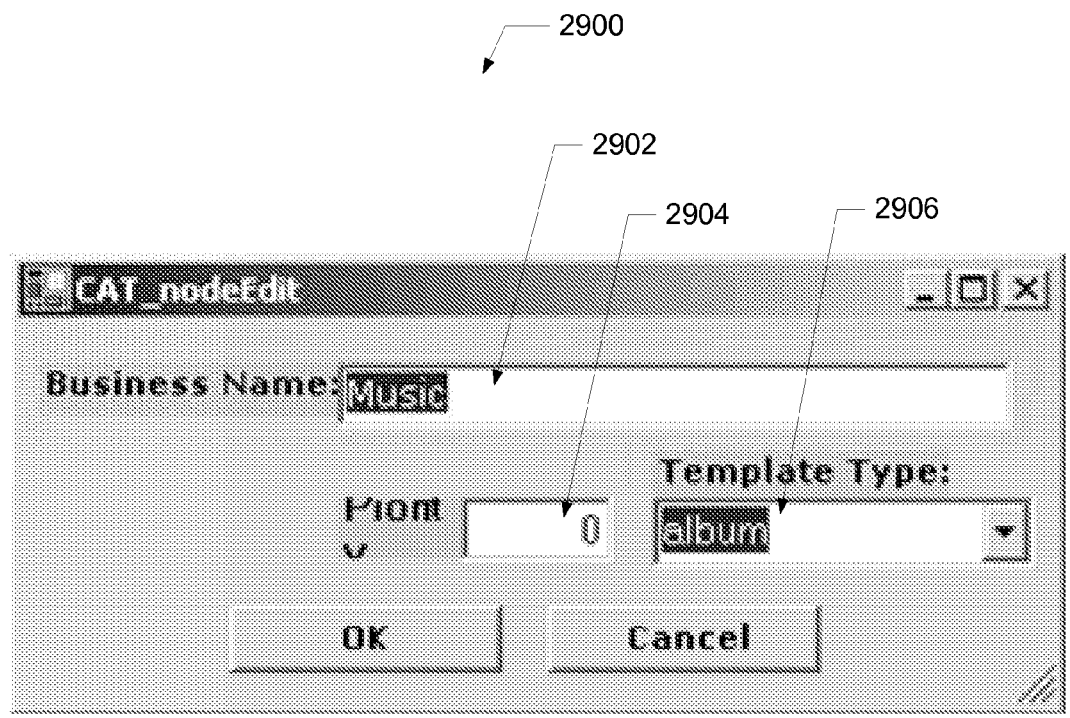
FIG. 29 shows one implementation of the new/edit interface.

FIG. 29 shows one implementation of the new/edit interface 2900. This "mini" editing interface 2900 is for creating or editing individual Categories or nodes of a Category tree. The Business Name 2902 is for internal use only, and is used during path construction, whereas the Priority 2904 is used to determine order during category display. The Template Type 2906 of a category is a drop-down menu that defines the template type.

Figure 30:
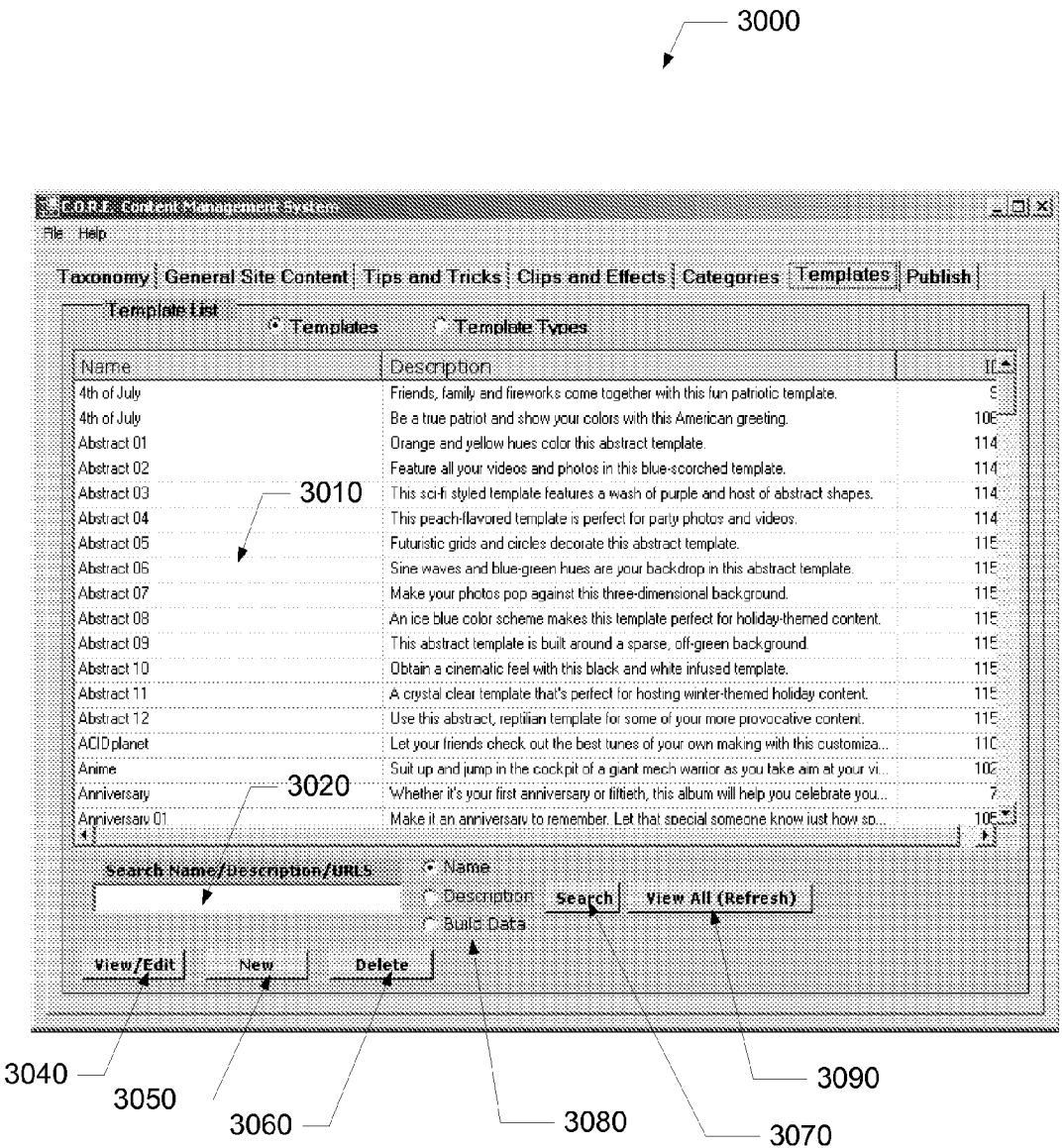
FIG. 30 shows one implementation of Templates tab window of the CORE CMS tool.

FIG. 30 shows one implementation of Templates tab window 3000 of the CORE CMS tool. Templates are created by the producer, and are made available to the end-user of the site through associations with Categories. Templates are of a particular type, and each type is expecting the end-user to input a certain set of data, such as text and uploaded media files, to populate their instance of that particular template. Templates reference a source framework, such as a flash movie, that has been designed to work within the CORE context. Templates can also reference elements called "picks" that represent available backgrounds or music for that template.

The Templates List interface 3000 shows all of the Template items in a particular database, with links to editing interfaces. The "Search/Edit" area of the interface also allows the user to filter the list display based on search criteria, and to view, edit, or create Template Items within the database.

In the illustrated implementation, the Templates tab window 3000 also includes a list box 3010, a search name/description/build data box 3020, a view/edit button 3040, a new button 3050, a delete button 3060, a search button 3070, a build-data radio button 3080, and a view all button 3090.

The list box 3010 displays all of the Template Items in a particular database. Individual items are selected using a single-click. A Shift-Click allows the user to select a range of items, and a ctrl-click allows the selection of additional single items. Double-clicking an item brings up the "View/Edit" interface for that item. Items may be sorted by a particular header category by clicking on that category. Clicking again in a particular category causes the items to be sorted in reverse order. The illustrated implementation shows the Template Items sorted by name.

Given a particular search string in the text box 3020, and given the search area defined by the selection of either the Name, Description, or Build Data radio button 3080, pressing the Search Button 3070 will cause the List Box 3010 to display only the items that match the search criteria. For instance, entering "anniversary" in the search string, selecting the Name radio button 3080, and pressing Search 3070 will cause only those items with the string "anniversary" somewhere in the name to be displayed. Pressing the "View All" button 3090 will negate the search feature and cause all items to be displayed again until the next search is performed.

The View/Edit button 3040 brings up the "View/Edit" interface (see FIG. 31) for the selected item in the list box 3010. If no items, or multiple items are selected, this button 3040 has no effect. Double-clicking an item in the list box 3010 has the same effect as clicking this button 3040.

The New button 3050 brings up the "New" interface for creating a new Template Item in the database. This interface is almost identical to the "View/Edit" interface.

The Delete button 3060 deletes all selected Template Items in the list box. Before deletion, a confirmation prompt will appear to protect the user against inadvertently deleting items by mistake.

Figure 31:
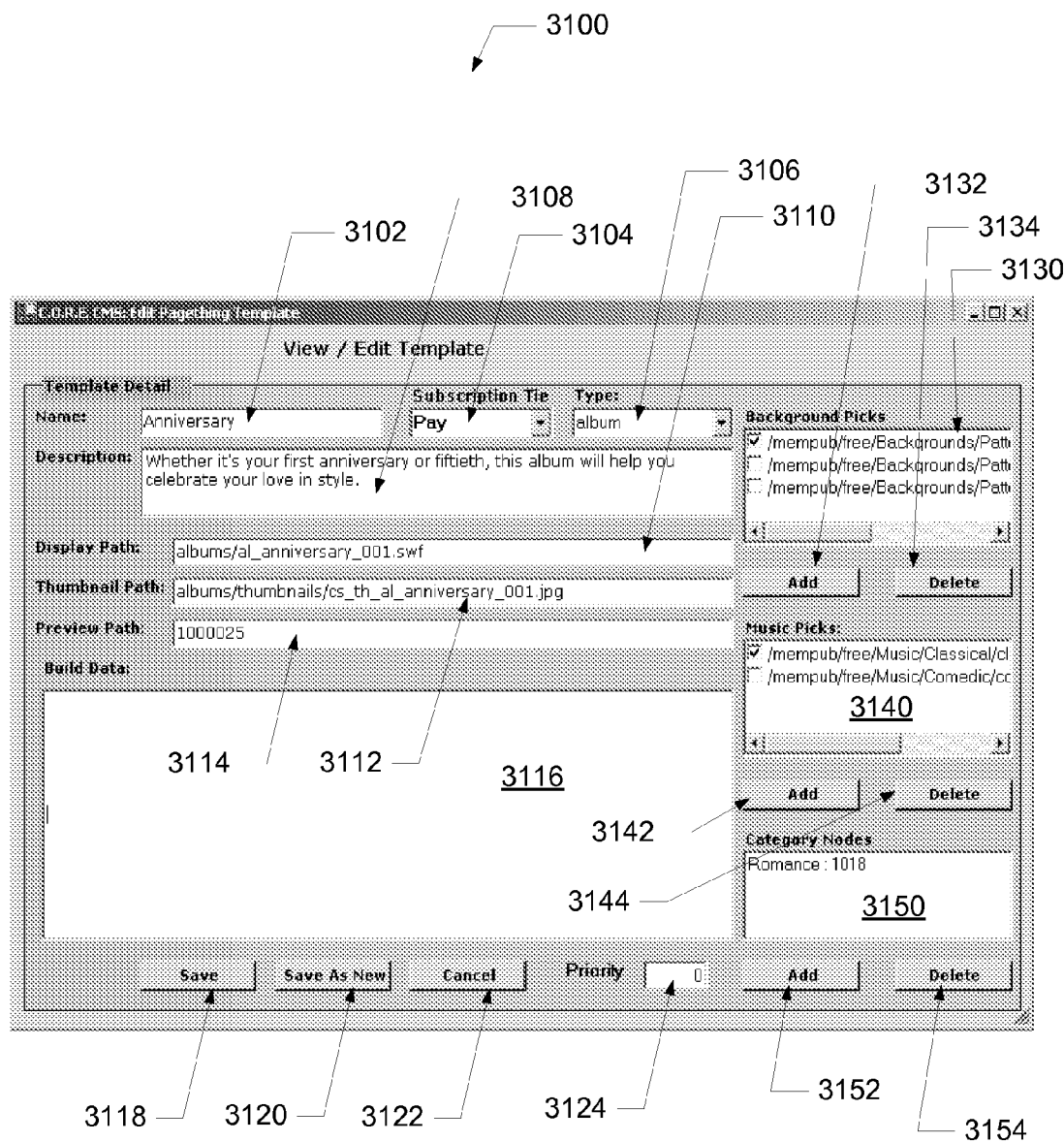
FIG. 31 shows one implementation of the View/Edit interface for the Clips and Effects.

FIG. 31 shows one implementation of the View/Edit interface 3100 for the Clips and Effects, which enables the detailed information in an individual Template Item to be viewed and edited. When saved, these Templates are stored in the database as metadata that is intended to be used by the back-end site display technology in presenting the Template item to the end-user.

In the illustrated implementation, the View/Edit interface 3100 includes a name field 3102, a subscription tier box 3104, a template type box 3106, a description field 3108, a display path field 3110, a thumbnail path field 3112, a preview path field 3114, a build data field 3116, a save button 3118, a save as new button 3120, a cancel button 3122, and a priority box 3124. The View/Edit interface 3100 further includes a background picks area 3130, a music picks area 3140, and a category nodes area 3150.

The name field 3102 allows the content creator to change the name of the Template Item that is displayed to an end user who is viewing the site. When this interface 3100 is accessed by using the "New" button 3050 from the main Templates List interface 3000, this field 3102 allows the content creator to enter the name of a new Template Item.

The subscription tier box 3104 allows the content creator to specify whether the Template Item is free, or is only viewable to subscribers.

The template type box 3106 allows the content creator to specify the type of the Template. The template types include Album, Scrapbook, E-Card, Music, and Game. Since all Templates of a specific type are formatted similarly with regard to end-user uploaded assets, a user can, while working on a project, change the template to another of the same type.

The description field 3108 allows the content creator to enter any extra descriptive information about the Template Item. This is displayed to the end user as additional information about that template.

The display path field 3110 includes the relative path of the template object (usually a Flash movie) that defines the template itself. This field 3110 needs to be filled by the creator of the Template.

The thumbnail path field 3112 allows the content creator to specify a relative path (including filename) that serves as a small thumbnail to be displayed to the end-user in association with the Template Item.

The preview path field 3114 is used internally by the system to grab the Template, based on a unique identifier.

The build data field 3116 is reserved for markup language (such as HTML) data that would define a template.

The save button 3118 causes the CORE CMS tool to save the Template Item to the database. If creating a new Template Item, the saving over an existing Template Item is not allowed. If editing an existing Template Item, and the Template Item name has been changed, the tool launches a confirmation pop-up if attempting to save over an existing named Template Item. Otherwise, the save is performed automatically, the View/Edit interface 3100 is closed, and a "Template Successfully Saved" message appears in the header of the main interface.

The save as new button 3120 is similar to the "Save" button in most respects, this button 3120 forces the tool to save the Template Item to the database as a new template, and does not close the editing interface 3100.

The cancel button 3122 closes the Template View/Edit interface 3100 and returns the user to the main interface 3000. Changes that may have been made in the View/Edit interface 3100 are not saved.

Like the category priority field, the template priority field 3124 determines the order in which the Templates are displayed to the end user. The lower that this value is set, the higher the priority will be for this item. If two or more items have the same priority, then the display order will be determined by order within the database.

Templates may have one or more selectable backgrounds. Thus, the background picks area 3130 of the interface 3100 is set up so that content creators can define what those backgrounds should be. Selecting the "Add" button 3132 opens an asset browser that allows the content creator to select one or more images to add to this checklist. The asset browser window is identical to the Clips and Effects asset browser shown in FIG. 25. However, the root node is "mempub" instead of "clips_effects".

Just as with backgrounds, a template may have one or more selectable music tracks that play along with that template. Thus, the music picks area 3140 of the interface 3100 is set up so that content creators can define the music streams. Selecting the "Add" button 3142 opens an asset browser that allows the content creator to select one or more music streams to add to this checklist. The "checked" item will be the default music played for an end-user's template.

The list of category nodes shown in the category nodes area 3150 shows the path(s) of any category nodes to which this Template item is attached. The "Add" button 3152 launches a Category Browser (see FIG. 32), and the "Delete" button 3154 removes selected items from the list, after a positive response to a delete confirmation dialog.

Figure 32:
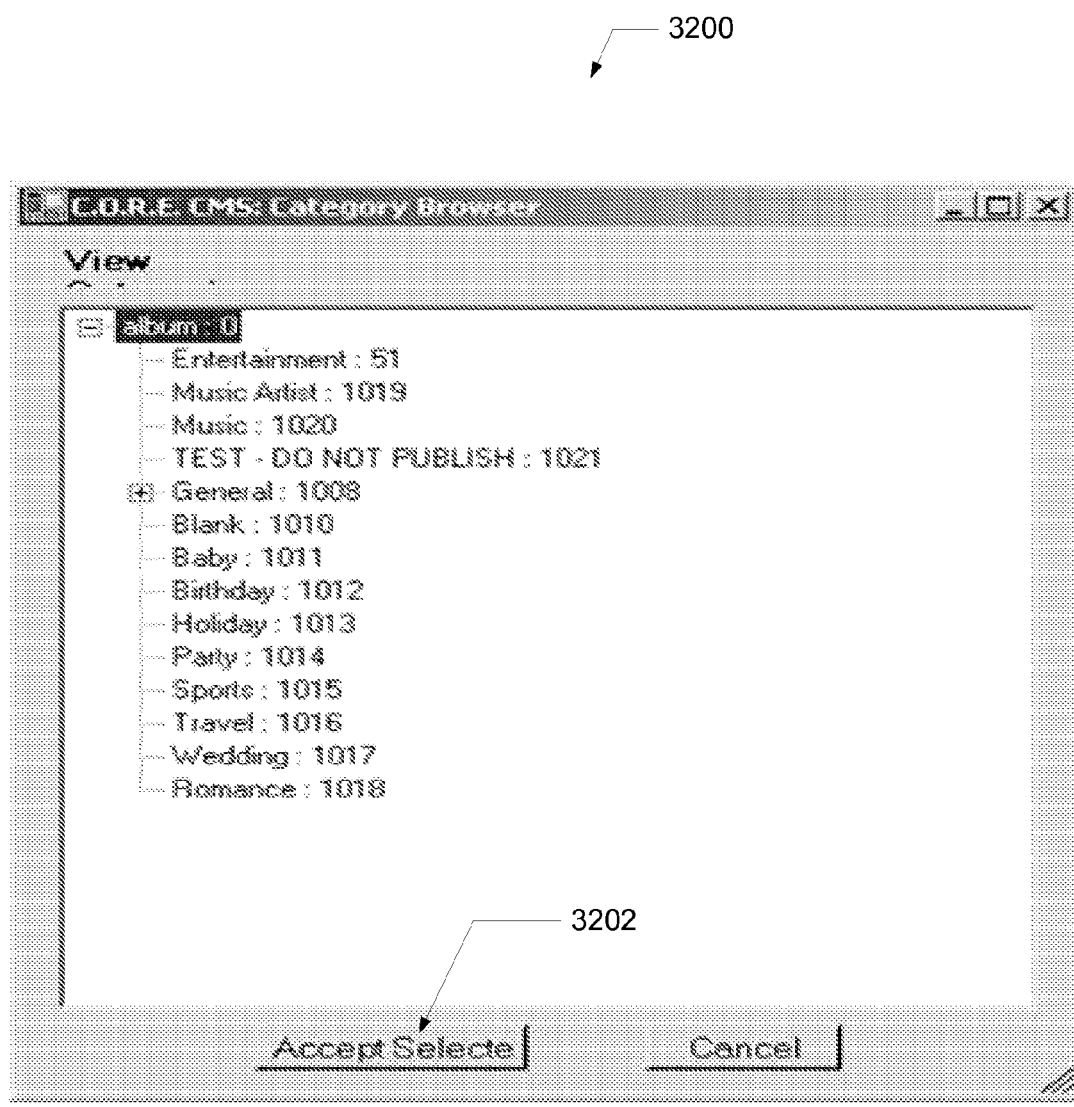
FIG. 32 shows one implementation of the template category browser interface.

FIG. 32 shows one implementation of the template category browser interface 3200, which allows the site creator to view and select taxonomy nodes from the "Tips and Tricks" root taxonomy. By pressing the "Accept Selected" button 3202, the selected taxonomy node is added to the list of associated taxonomy nodes for the Tips and Tricks Item that is currently being edited.

Figure 33:
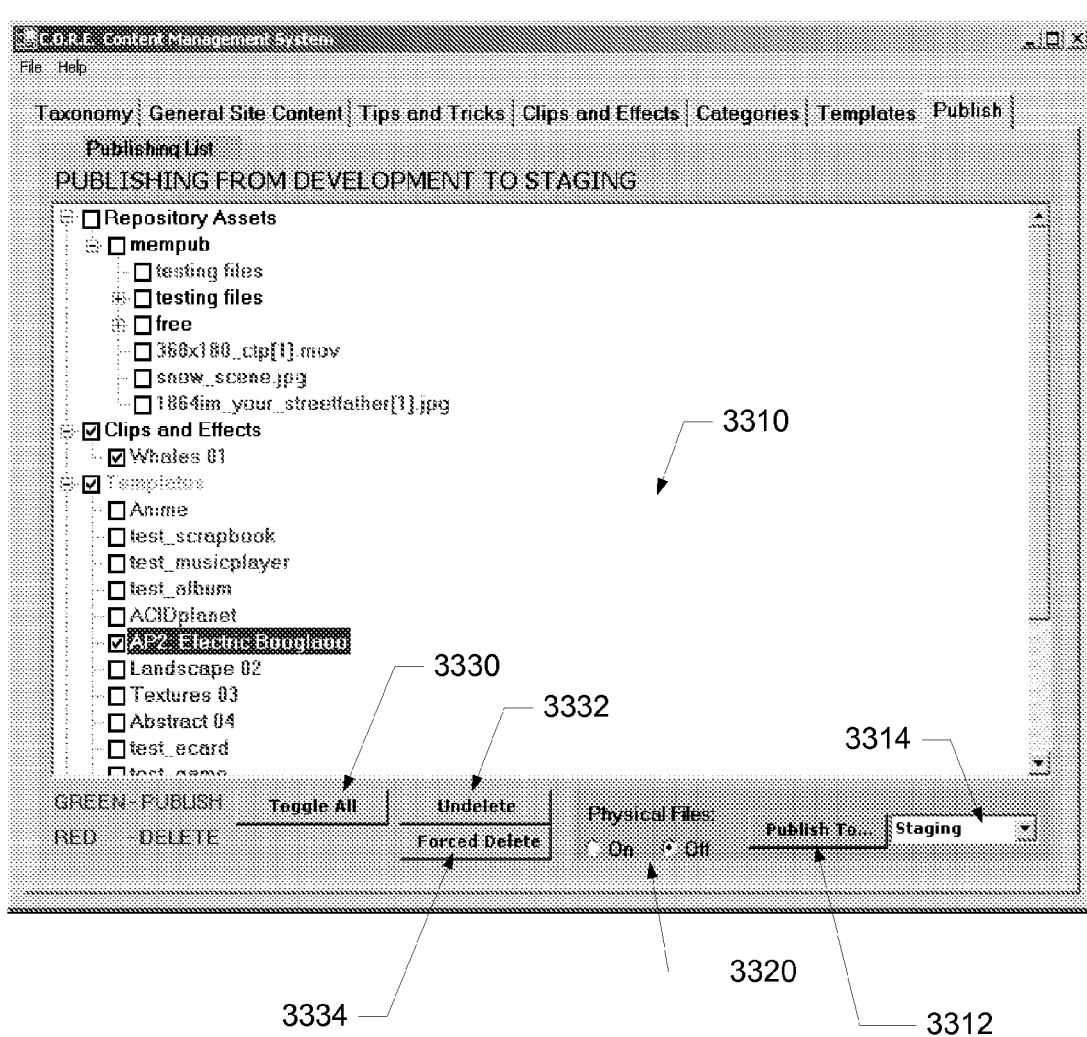
FIG. 33 shows one implementation of a Publish tab window.

FIG. 33 shows one implementation of a Publish tab window 3300 of the CORE CMS tool. The Publishing list interface 3300 within this tab serves as a tree-structured list 3310 of items to be published or deleted, organized by category. This list 3310 includes all of the items that have been created, modified, or deleted and whose changes have not been published to the next stage in the publishing pipeline. Once one or more items have been selected in the tree view 3310, the user can then use the "Publish To" button 3312 to move the selected items from the "Source" database and file system to the "Destination" database and file system. The "Destination" is selected from the drop-down list 3314 next to the "Publish To" button 3312.

The tree view 3310 displays all of the items within the "Source" database that have been newly created, modified or deleted. If the "Physical Files:" radio toggle 3320 is set to "On", this tree view 3310 also includes any physical content files that have been created, modified, or deleted. The population of this tree is automatic, and individual items are selected/de-selected using the check box to the left of the item. In one implementation, entire groups of items are selected/deselected by using the "parent" check-box of those items. Double-clicking an actual publishable item brings up the "View/Edit" interface for that item. A publishable item is shown in either green or red, with parent categories or groups shown in black. A green item is meant to be published, whereas a red item is flagged for deletion. Also, note that a black parent node in the tree will be shown as gray if one or more, but not all child items, are selected.

The physical files radio toggle 3320 allows the user to choose whether to have physical content files available for publishing in the list 3310. All other types of items reside in the database, and are therefore not physical files. Selecting "on" or "off" will cause the tree view 3310 to update automatically to show or not show physical files.

The "Publish To" button 3312 causes all selected items in the tree view 3310 to be published to the pipeline stage selected in the accompanying drop-down menu box 3314. If "Staging" is selected in the menu box 3314, the items will be published from the development environment to the staging environment. Otherwise if "Live" is selected, the items will be published from the staging to the live environment. If the physical files toggle 3320 is ON and the target environment is "Live", then an additional process will be invoked to synchronize the staging and live environments' content file system.

In the illustrated implementation, the Publish tab window 3300 also includes a toggle all button 3330, an undelete button 3332, and a forced delete button 3334. The toggle all button 3330 selects/de-selects every item in the tree view 3310. The undelete button 3332 disables the "delete" flag for every red item that is selected. One use of this feature is when an item can't be deleted due to database constraint violations. In particular, certain items may include database links to other items, and these links must be disabled in that item's editor before a proper deletion can occur. The forced delete button 3334 forces a deletion of all selected items without publishing that deletion to the next stage of the publishing pipeline.

Figure 34:
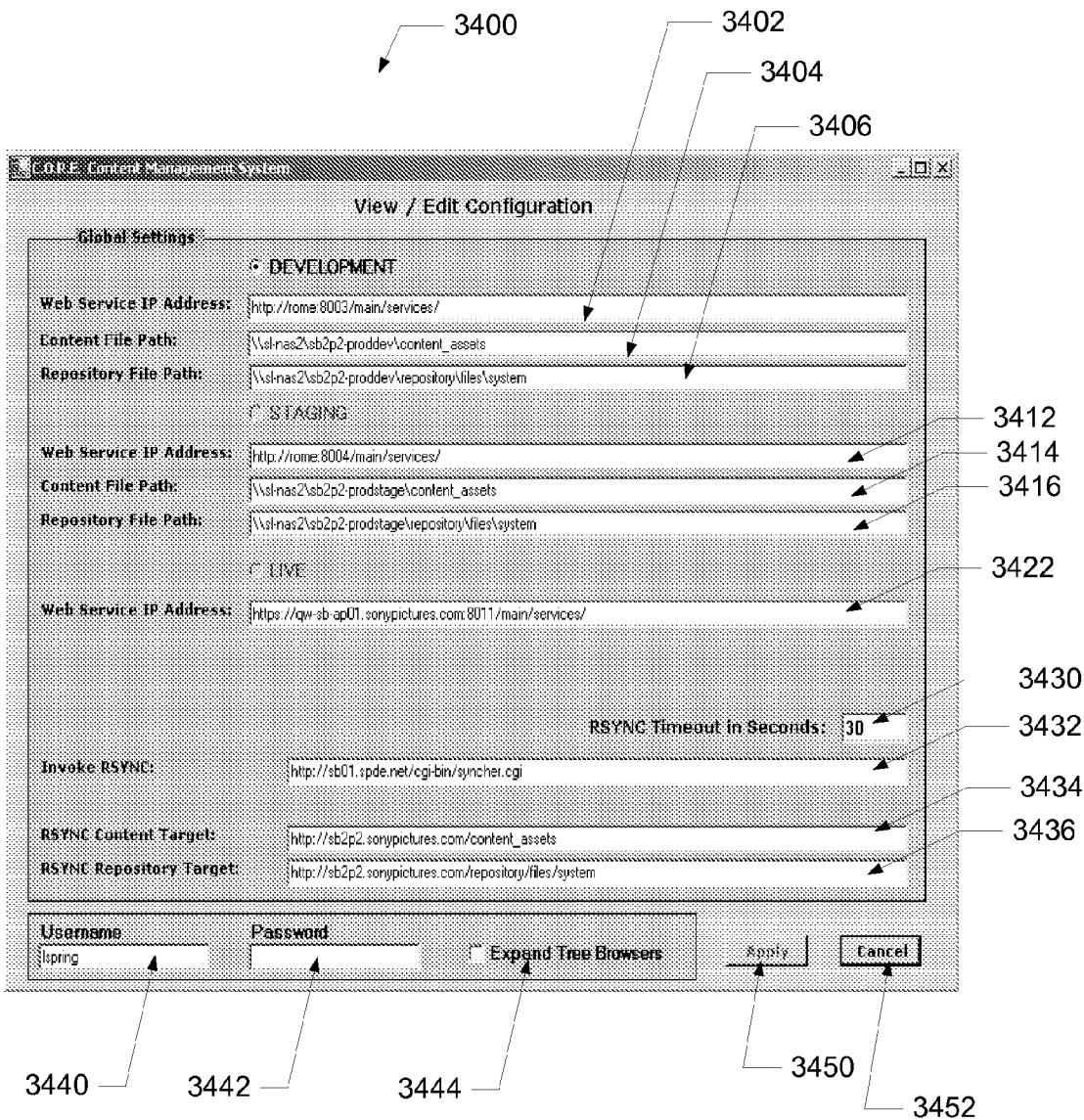
FIG. 34 shows one implementation of the View/Edit interface for configuring the global settings.

FIG. 34 shows one implementation of the View/Edit interface 3400 for configuring the global settings. In one implementation, this interface 3400 can be opened by selecting "File/Configure" from the "File" menu 1002 of the main interface (e.g. 1000). Thus, this interface 3400 allows the user to set and save global configuration data for the CORE CMS tool. The global configuration data includes IP addresses for the various environments in the publishing pipeline, along with root file system paths that are used to create and manage relative path data for file objects within the database.

In the illustrated implementation, the View/Edit interface 3400 includes a web service IP address field 3402, a content file path field 3404, and a repository file path field 3406 for the development environment. The View/Edit interface 3400 also includes same fields 3412, 3414, 3416 for the staging environment, and a web service IP address field 3422 for the live environment. The View/Edit interface 3400 further includes an 'rsync' timeout period 3430, an invoke rsync field 3432, an rsync content target field 3434, and an rsync repository target field 3436. The View/Edit interface 3400 further includes a username field 3440, a password field 3442, an expand tree browser radio selector 3444, an apply button 3450, and a cancel button 3452.

The web service IP address 3402, 3412, 3422 indicates to the CORE CMS tool where to find the instances of the CORE services for each stage in the publishing pipeline. Each instance of a server-side CORE database within the publishing pipeline is accessed by a unique instance of the backend "services". These services are a set of SOAP-based application program interfaces (APIs) that allow the CORE CMS tool and other clients to communicate with the databases in a controlled and well-defined fashion.

The root file path 3404, 3406, 3414, 3416 provides file path information of physical files. For each stage in the publishing pipeline, a disk-based file system is also used to store physical files that are used by the CORE rendering system. Since relative paths are stored in the database file objects, the CORE CMS tool must know how and where to manipulate (move) physical files whenever items in the database are published that have associated physical files. Also, when creating new file-based items in the database, the path of the "active" or "source" environment is used as the root for the file search/select interface. When a file is actually selected, this root path is then stripped from the full path of the file to provide a relative path that is subsequently saved to the database.

The apply button 3450 changes the settings to reflect any changes that the tool user has made within this interface 3400. A configuration file is saved as well, so that the user's new settings will be enabled on startup of the next session.

The cancel button 3452 closes the View/Edit Configuration interface and returns the user to the main interface. Changes that may have been made in the View/Edit Configuration interface are not saved.

The various implementations of the invention are realized in electronic hardware, computer software, or combinations of these technologies. Most implementations include one or more computer programs executed by a programmable computer. For example, referring to FIG. 1, in one implementation, the server system includes one or more computers executing software implementing the RMP environment. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description describes computers connecting to servers through the Internet, additional variations and combinations are possible. For example, in other implementations, different types of network-enabled devices can be used, such as a network-enabled television or phone. Accordingly, the present invention is not limited to only those implementations described above.

What is claimed is:

1. A content management system for media publishing, comprising:

a plurality of content management tools for managing media contents during a publication process, said plurality of content management tools providing transcoding to convert a format of a selected media item to a specific target format of a media slot corresponding to said selected media item;

a publishing pipeline configured to operate in concert with said plurality of content management tools during the publication process to control development, distribution, and access of the media contents, wherein said publishing pipeline provides a plurality of environments for staged and organized development and publication of the media contents, the plurality of environments including a development/production environment, a staging environment, and a live environment; and a producer configured to generate and edit templates of media items and associated data when the plurality of environments is in a development/production environment, wherein each template of said templates includes a number of media slots, and each media slot defines a genre of media and a specific target format that is accepted by said each media slot, and wherein the format of said selected media item does not need to match said specific target format of said media slot corresponding to said selected media item because said transcoding by said plurality of content management tools provides the conversion of the selected media item format to said specific target format.

2. The system of claim 1, wherein the publishing pipeline include a plurality of producers configured to push new media content through the publishing pipeline onto live environment.

3. The system of claim 2, wherein said plurality of content management tools allows each producer to manage taxonomies and editorial content of various types of websites.

4. The system of claim 1, wherein said content management system is a system resident on a client computer.

5. The system of claim 4, wherein said content management system includes a net based application.

6. The system of claim 1, wherein said plurality of content management tools includes taxonomies to define an overall dynamic site content structure of said content management system.

7. The system of claim 1, wherein said plurality of content management tools includes a create-once-render-everywhere (CORE) user interface manager to support building, editing, and publishing a media project including media contents.

8. A method of managing media contents and data, comprising:
providing a plurality of content management tools to transcode and convert a format of a selected media item to a specific target format of a media slot corresponding to said selected media item;
configuring a publishing pipeline to operate in concert with said plurality of content management tools during a publication process to control development, distribution, and access of the media contents and data.
wherein said configuring a publishing pipeline provides a plurality of environments for staged and organized development and publication of the media contents and data,the plurality of environments including a development/production environment, a staging environment, and a live environment; and
generating and editing templates of media items and associated data when the plurality of environments is in a development/production environment,
wherein each template of said templates includes a number of media slots, and each media slot defines a genre of media and a specific target format that is accepted by said each media slot, and
wherein the format of said selected media item does not need to match said specific target format of said media slot corresponding to said selected media item because said transcoding by said plurality of content management tools provides the conversion of the selected media item format to said specific target format.

9. The method of claim 8, further comprising: maintaining a separate storage for each environment.

10. The method of claim 8, further comprising: migrating the templates of media contents and associated data to the staging environment.

11. The method of claim 10, further comprising:
testing and reviewing the templates of media contents and associated data in the staging environment.

12. The method of claim 11, further comprising:
migrating the tested and reviewed templates of media contents and associated data to the live environment.

13. The method of claim 12, further comprising:
enabling users to access the templates of media contents and associated data in the live environment for member publishing.

14. The method of claim 8, further comprising:
allowing producers to import new media contents and associated data into a table in the live environment.

15. The method of claim 14, further comprising:
flagging the new media contents and associated data when the producer imports new media contents and associated data into the table.

16. The method of claim 8, wherein said configuring a publishing pipeline includes providing a developing/production environment.

17. The method of claim 8, wherein said configuring a publishing pipeline includes providing a staging environment.

18. The method of claim 8, wherein said configuring a publishing pipeline includes providing a live environment.

19. The method of claim 18, wherein said configuring a publishing pipeline includes pushing new media content through said publishing pipeline onto the live environment.

20. The method of claim 19, wherein said providing a plurality of content management tools includes managing taxonomies and editorial content of various types of websites.

21. The method of claim 20, further comprising:
storing the taxonomies as a flat table of individual nodes that have parent links and associated data.

22. The method of claim 21, wherein the associated data includes a business name.

23. The method of claim 8, wherein the taxonomies are configured in a tree structure.

24. A computer program, stored in a tangible storage medium, for use in managing media contents, the program comprising executable instructions that cause a computer to:
provide a plurality of content management tools to transcode and convert a format of a selected media item to a specific target format of a media slot corresponding to said selected media item;
configure a publishing pipeline to operate in concert with said plurality of content management tools during publication process to control access and distribution of the media contents,
wherein said publishing pipeline provides a plurality of environments for staged and organized development and publication of the media contents, the plurality environments including a development/production environment, a staging environment, and a live environment; and
generate and edit templates of media items and associated data when the plurality of environments is in a development/production environment,
wherein each template of said templates includes a number of media slots, and each media slot defines a genre of media and a specific target format that is accepted by said each media slot, and
wherein the format of said selected media item does not need to match said specific target format of said media slot corresponding to said selected media item because said transcoding by said plurality of content management tools provides the conversion of the selected media item format to said specific target format.

25. The computer program of claim 24, wherein said configuring a publishing pipeline includes pushing new media content through said publishing pipeline onto the live environment.

26. The computer program of claim 24, wherein said providing a plurality of content management tools includes managing taxonomies and editorial content of various types of websites.

27. The computer program of claim 26, further comprising:
storing the taxonomies as a flat table of individual nodes that have parent links and associated data.

28. A content management system for media publishing, comprising:
a content management means for managing media contents during a publication process, said content management means configured to transcode and convert a format of a selected media item to a specific target format of a media slot corresponding to said selected media item;
a pipeline means for operating in concert with said content management means during the publication process to control access and distribution of the media contents,
wherein said pipeline means provides a plurality of environments for staged and organized development and publication of the media contents, the plurality of environments including a development/production environment, a staging environment, and a live environment; and
a producing means for generating and editing templates of media items and associated data when the plurality of environments is in a development/production environment,
wherein each template of said templates includes a number of media slots, and each media slot defines a genre of media and a specific target format tat is accepted by said each media slot, and
wherein the format of said selected media item does not need to match said specific target format of said media slot corresponding to said selected media item because said transcoding by said plurality of content management tools provides the conversion of the selected media item format to said specific target format.

29. A content management system for media publishing, comprising:
a content management means for managing media contents during a publication process, said content management means configured to transcode and convert a format of a selected media item to a specific target format of a media slot corresponding to said selected media item;
a pipeline means for operating in concert wit said content management means during the publication process to control development, distribution, and access of the media contents,
wherein said pipeline means provides a plurality of environments for staged and organized development and publication of the media contents the plurality of environments including a development/production environment, a staging environment, and a live environment; and
a producing means for generating and editing templates of media items and associated data when the plurality of environments is in a development/production environment,
wherein each template of said templates includes a number of media slots, and each media slot defines a genre of media and a specific target format that is accepted by said each media slot, and
wherein the format of said selected media item does not need to match said specific target format of said media slot corresponding to said selected media item because said transcoding by said plurality of content management tools provides the conversion of the selected media item format to said specific target format.

* * * * *